(12) United States Patent
Yajima et al.

(10) Patent No.: US 10,719,053 B2
(45) Date of Patent: Jul. 21, 2020

(54) WEARABLE DEVICE

(71) Applicant: SONY CORPORATION, Tokyo (JP)

(72) Inventors: Masakazu Yajima, Kanagawa (JP); Hideo Niikura, Tokyo (JP); Masataka Suzuki, Tokyo (JP); Yayoi Fuchiki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 15/525,668

(22) PCT Filed: Nov. 2, 2015

(86) PCT No.: PCT/JP2015/080939
§ 371 (c)(1),
(2) Date: May 10, 2017

(87) PCT Pub. No.: WO2016/080182
PCT Pub. Date: May 26, 2016

(65) Prior Publication Data
US 2017/0336763 A1   Nov. 23, 2017

Related U.S. Application Data

(60) Provisional application No. 62/081,289, filed on Nov. 18, 2014.

(51) Int. Cl.
*G04G 19/00* (2006.01)
*G06F 1/16* (2006.01)
(Continued)

(52) U.S. Cl.
CPC ............. *G04G 19/00* (2013.01); *G04G 17/04* (2013.01); *G04G 17/08* (2013.01); *G04G 21/04* (2013.01); *G06F 1/16* (2013.01)

(58) Field of Classification Search
CPC ........ G04G 17/04; G04G 17/08; G04G 19/00; G04G 21/04
See application file for complete search history.

(56) References Cited

U.S. PATENT DOCUMENTS

| 5,491,651 A | * | 2/1996 | Janik | ....................... G06F 1/163 |
| | | | | 361/679.03 |
| 5,615,179 A | * | 3/1997 | Yamamoto | ........... G04G 17/083 |
| | | | | 224/168 |

(Continued)

FOREIGN PATENT DOCUMENTS

| JP | 56-120972 A | 9/1981 |
| JP | 57-154086 A | 9/1982 |

(Continued)

*Primary Examiner* — Daniel P Wicklund
(74) *Attorney, Agent, or Firm* — Chip Law Group

(57) ABSTRACT

A wearable device includes a plurality of power generation devices; at least one of an electrical storage device, a computation device, a storage device, or a communication device; a plurality of modularized unit blocks, wherein a first modularized unit block of the plurality of modularized unit blocks comprises a first power generation device of the plurality of power generation devices, and wherein a second modularized unit block of the plurality of modularized unit blocks comprises at least one of the electrical storage device, the computation device, the storage device, or the communication device; and a plurality of holding members, wherein each of the plurality of holding members is configured to accommodate a corresponding modularized unit block of the plurality of modularized unit blocks.

15 Claims, 23 Drawing Sheets

(51) Int. Cl.
*G04G 21/04* (2013.01)
*G04G 17/04* (2006.01)
*G04G 17/08* (2006.01)

(56) References Cited

U.S. PATENT DOCUMENTS

| | | | | |
|---|---|---|---|---|
| 6,619,835 B2* | 9/2003 | Kita | ............... | A44C 5/0015 |
| | | | | 368/10 |
| 6,619,836 B1* | 9/2003 | Silvant | ............... | G04G 17/08 |
| | | | | 368/281 |
| 9,288,836 B1* | 3/2016 | Clement | ............ | H04W 84/18 |
| 9,463,267 B2* | 10/2016 | Katsumoto | ............ | G06F 3/033 |
| 9,618,907 B2* | 4/2017 | Su | ............... | G04G 17/02 |
| 2004/0224223 A1* | 11/2004 | Sun | ............... | H01M 2/1061 |
| | | | | 429/127 |
| 2007/0279852 A1* | 12/2007 | Daniel | ............... | A44C 5/0007 |
| | | | | 361/679.03 |
| 2014/0078694 A1* | 3/2014 | Wissmar | ............... | G04G 17/04 |
| | | | | 361/749 |
| 2015/0109723 A1* | 4/2015 | Holtzman | ............ | G06F 1/1635 |
| | | | | 361/679.03 |
| 2015/0115870 A1* | 4/2015 | Vance | ............... | H02J 7/0042 |
| | | | | 320/101 |
| 2015/0223355 A1* | 8/2015 | Fleck | ............... | G06F 1/163 |
| | | | | 361/679.03 |
| 2016/0014245 A1* | 1/2016 | Zaitsev | ............... | G06F 1/163 |
| | | | | 455/557 |
| 2016/0026156 A1* | 1/2016 | Jackson | ............... | G04G 9/007 |
| | | | | 368/14 |
| 2016/0070296 A1* | 3/2016 | Koo | ............... | G06F 1/163 |
| | | | | 361/679.03 |
| 2016/0094259 A1* | 3/2016 | Hatanaka | ............... | H04B 1/385 |
| | | | | 455/90.2 |
| 2016/0139564 A1* | 5/2016 | Tsushima | ............... | G04R 60/04 |
| | | | | 368/282 |
| 2016/0239135 A1* | 8/2016 | Kawaguchi | ............ | G06F 3/011 |
| 2017/0205774 A1* | 7/2017 | Mao | ............... | G04C 10/02 |

FOREIGN PATENT DOCUMENTS

| | | |
|---|---|---|
| JP | 59-155583 U | 10/1984 |
| JP | 59-218983 A | 12/1984 |
| JP | 60-115891 A | 6/1985 |
| JP | 02-030085 U | 2/1990 |
| JP | 3043236 U | 11/1997 |
| JP | 10-253776 A | 9/1998 |
| JP | 2002-139583 A | 5/2002 |
| JP | 2011-013026 A | 1/2011 |

* cited by examiner

WEARABLE DEVICE

CROSS REFERENCE TO RELATED APPLICATIONS

This application is a U.S. National Phase of International Patent Application No. PCT/JP2015/080939 filed on Nov. 2, 2015, which claims priority benefit of U.S. Patent Application No. 62/081,289 filed on Nov. 18, 2014. Each of the above-referenced applications is hereby incorporated herein by reference in its entirety.

TECHNICAL FIELD

The present disclosure relates to a wearable device.

BACKGROUND ART

In the related art, wrist watches are exemplified as devices provided with power generation devices from among body-mounted devices (wearable devices) designed on the assumption of mounting on users. As the power generation devices provided in the wearable devices, a solar power generation device that generates power by solar light, a kinetic mechanism that uses vibration and generates power by self-winding, and a thermoelectric power generation device that generates power by a temperature difference between a body temperature and an ambient temperature, for example, are known. In addition, there is also a ring-type wearable device that uses electric power generated by using a body temperature to display letters or the like on the surface thereof. For example, Patent Literature 1 discloses a wrist watch provided with a solar power generation device. Patent Literature 2 discloses a wrist watch provided with a kinetic mechanism. Patent Literature 3 discloses a wrist watch provided with a thermoelectric power generation device.

A mobile-type electrical storage device provided with an appearance of an accessory is known though no power generation device is mounted thereon (Non-Patent Literature 1). There is also a combination-type bracelet that can be configured into a desired bracelet as an accessory by selecting arbitrary parts though the bracelet is not a wearable device (Non-Patent Literature 2).

CITATION LIST

Patent Literature

Patent Literature 1: JP 2011-13026A
Patent Literature 2: JP H10-253776A
Patent Literature 3: JP 2002-139583A

Non-Patent Literature

Non-Patent Literature 1: chipolo.net/
Non-Patent Literature 2: nomination.shop24.makeshop.jp/html/page2/html

DISCLOSURE OF INVENTION

Technical Problem

However, all the wrist watches disclosed in above Patent Literature 1 to 3 include predetermined specific power generation devices, and users need to select a desired product from among limited products. If it is possible to configure a wearable device by selecting a desired power generation device in accordance with a purpose of use including a target who wears the wearable device, such as a person or an animal, or a location where the target wears the wearable device, it is possible to realize not only a wrist watch but also a wearable device that can be used for various purposes.

Thus, the present disclosure provides a novel and improved wearable device capable of being configured by selecting a desired power generation device.

Solution to Problem

According to the present disclosure, there is provided a wearable device including: at least one power generation device; or a power generation device and at least one of an electrical storage device, a computation device, a storage device, and a communication device. Any one of or a combination of those devices is configured of a unit block that is modularized.

Advantageous Effects of Invention

According to the present disclosure, a wearable device capable of being configured by selecting a desired power generation device is realized as described above.

Note that the effects described above are not necessarily limitative. With or in the place of the above effects, there may be achieved any one of the effects described in this specification or other effects that may be grasped from this specification.

MODES FOR CARRYING OUT THE INVENTION

Figure 1:
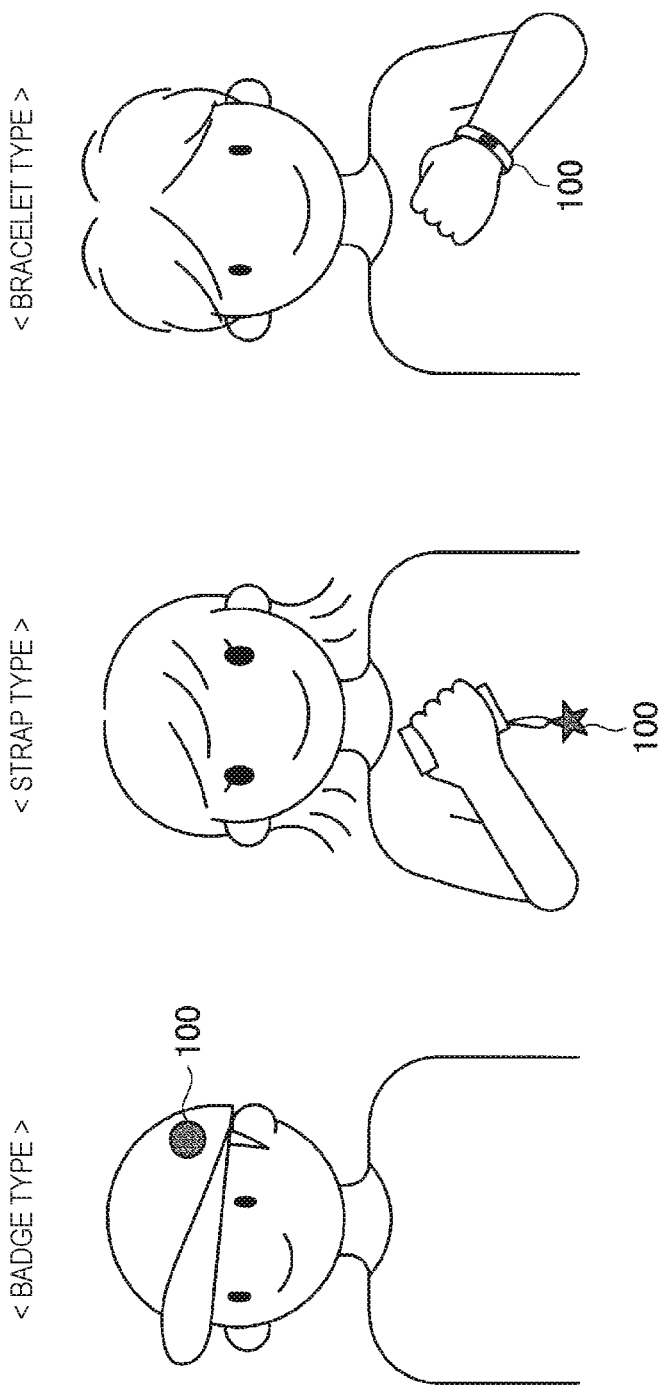
FIG. 1 is an explanatory diagram illustrating an example of an aspect of a wearable device according to each embodiment of the present disclosure.

Hereinafter, preferred embodiments of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Detailed description of background
2. Basic configuration example of wearable device
2-1. Overall outline of system
2-2. System configuration example
3. First embodiment (example of connection to flexible circuit board)
3-1. Overall configuration
3-2. Arrangement example
3-3. Configuration example of pieces
3-4. Effects of first embodiment
4. Second embodiment (another example of connection to flexible circuit board)
4-1. Configuration example
4-2. Effects of second embodiment
5. Third embodiment (another example of connection to flexible circuit board)
5-1. Configuration example
5-2. Effects of third embodiment
6. Fourth embodiment (example of connection in axial direction)
6-1. Overall configuration
6-2. Circuit configuration
6-3. Effects of fourth embodiment In the specification, the "wearable device" includes not only a body-mounted device that a user or the like wears but also a mobile-type device that the user carries.

1. Detailed Description of Background

As described above, there is a wrist watch provided with a solar power generation device, a kinetic mechanism, or a thermoelectric power generation device in the related art as an aspect of a wearable device provided with a power generation device. As another aspect of such a wearable device, there is also a ring-type wearable device that uses electric power generated by a body temperature and displays letters on the surface thereof. In contrast, there is a known wearable device that can be naturally carried by being designed to be able to be connected as at least a part of a belt of a wrist watch though the wearable device is not provided with a power generation device.

In the wearable device provided with a power generation device in the related art, a predetermined specific power generation device is fixed to a prescribed position, such as on a panel of the watch or on the rear side of the ring. Therefore, a user needs to select a desired product from among limited products when the user purchases a wearable device provided with a power generation device. The power generation device provided in such a wearable device is one predetermined type of power generation device and does not generate power when the power generation device is not present in a specific environment.

Furthermore, since the wearable device, such as a wrist watch belt-type wearable device, which can be naturally carried requires a power source, it is necessary to install a secondary battery in the belt or to provide a structure for extracting electric power from a main body part of the wrist watch or the like. If the secondary battery is installed in the belt, the number of secondary batteries that are to be charged increases in the entire wrist watch. If a structure of extracting the electric power from the main body part is provided, the structure becomes complicated.

In contrast, if the wearable device is provided with a power generation device, it becomes possible to perform power generation and charging inside the wearable device. If the type of the power generation device can be freely selected at that time, it is possible to use the wearable device while power generation is performed in various environments. Specifically, the position where the power generation device is to be arranged is restricted depending on the type thereof. If a solar power generation device is provided, for example, the power generation device may be arranged on the front surface side. If a thermoelectric power generation device that generates power by a difference between a body temperature and an ambient temperature is provided, the power generation device may be arranged at a position near the surface of the body. As described above, since the appropriate arrangement position of the power generation device differs depending on the type thereof, the range of the selection of the power generation device is ultimately limited if the installation position is determined in advance. Therefore, it is considered that a more appropriate wearable device can be realized if the installation position of the power generation device can also be appropriately selected in configuring the wearable device by freely selecting the power generation device.

In the wearable device according to the present disclosure as described below, the power generation device can be freely selected in consideration of the arrangement position as well. In this manner, it is possible to realize a wearable device that can be used for various purposes by selecting a desired power generation device in accordance with a purpose of use including a target who wears the wearable device or a location where the target wears the wearable device.

2. Basic Configuration Example of Wearable Device

A basic configuration common to wearable devices in the respective embodiments of the present disclosure will be described. Hereinafter, an example of a system that uses the wearable device will be described, and then an example of a system configuration of the wearable device will be described.

2-1. Overall Outline of System

Figure 2:
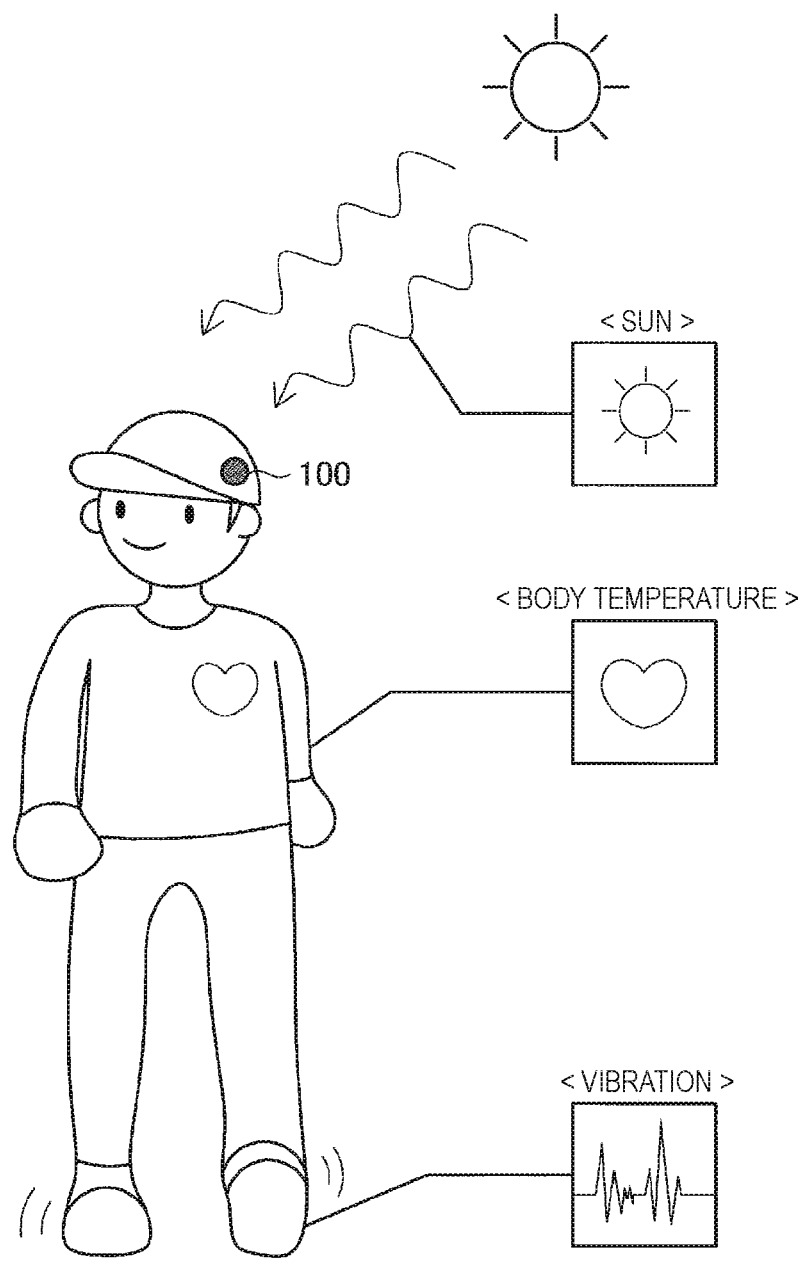
FIG. 2 is an explanatory diagram illustrating an example of a power generation method of a power generation device provided in a wearable device according to the embodiment.
Figure 3:
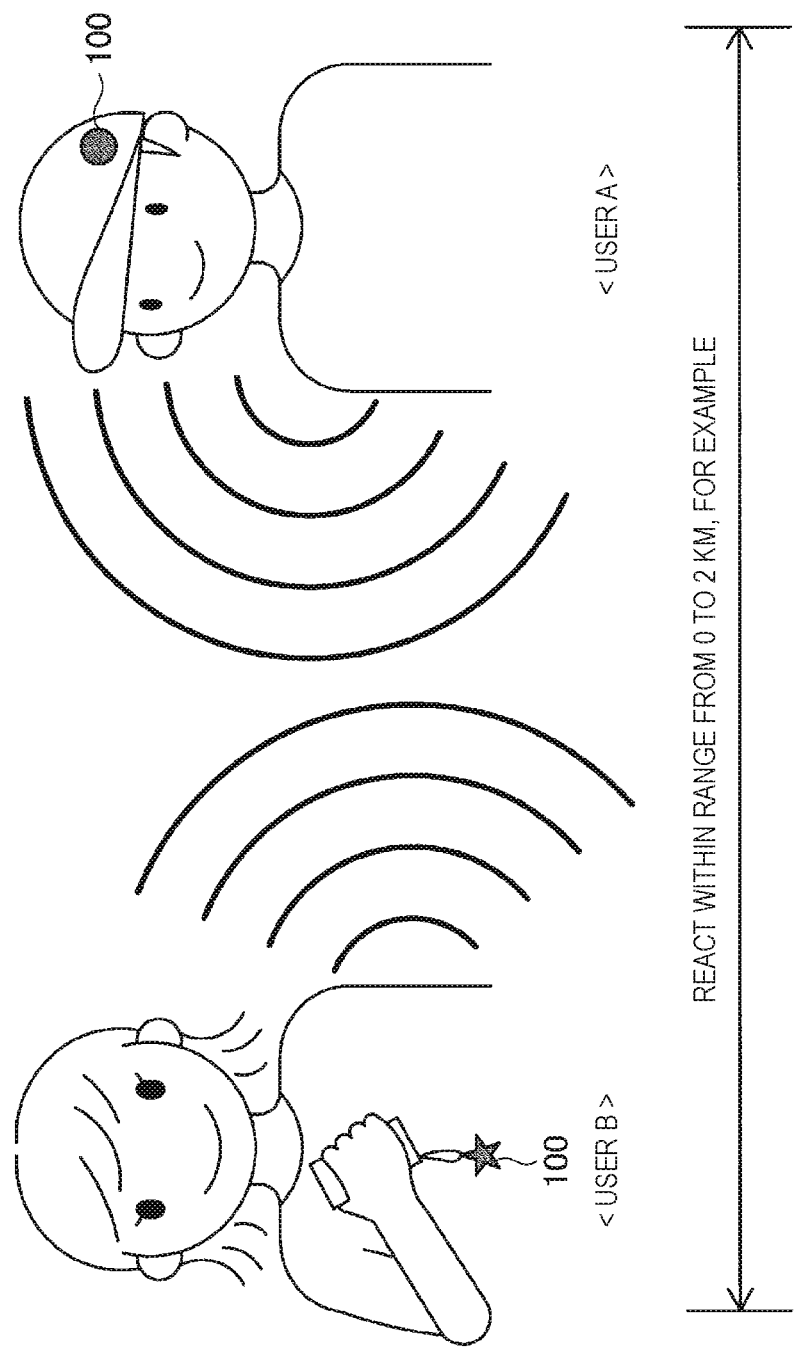
FIG. 3 is an explanatory diagram illustrating an example of a system that uses the wearable device according to the embodiment.
Figure 4:
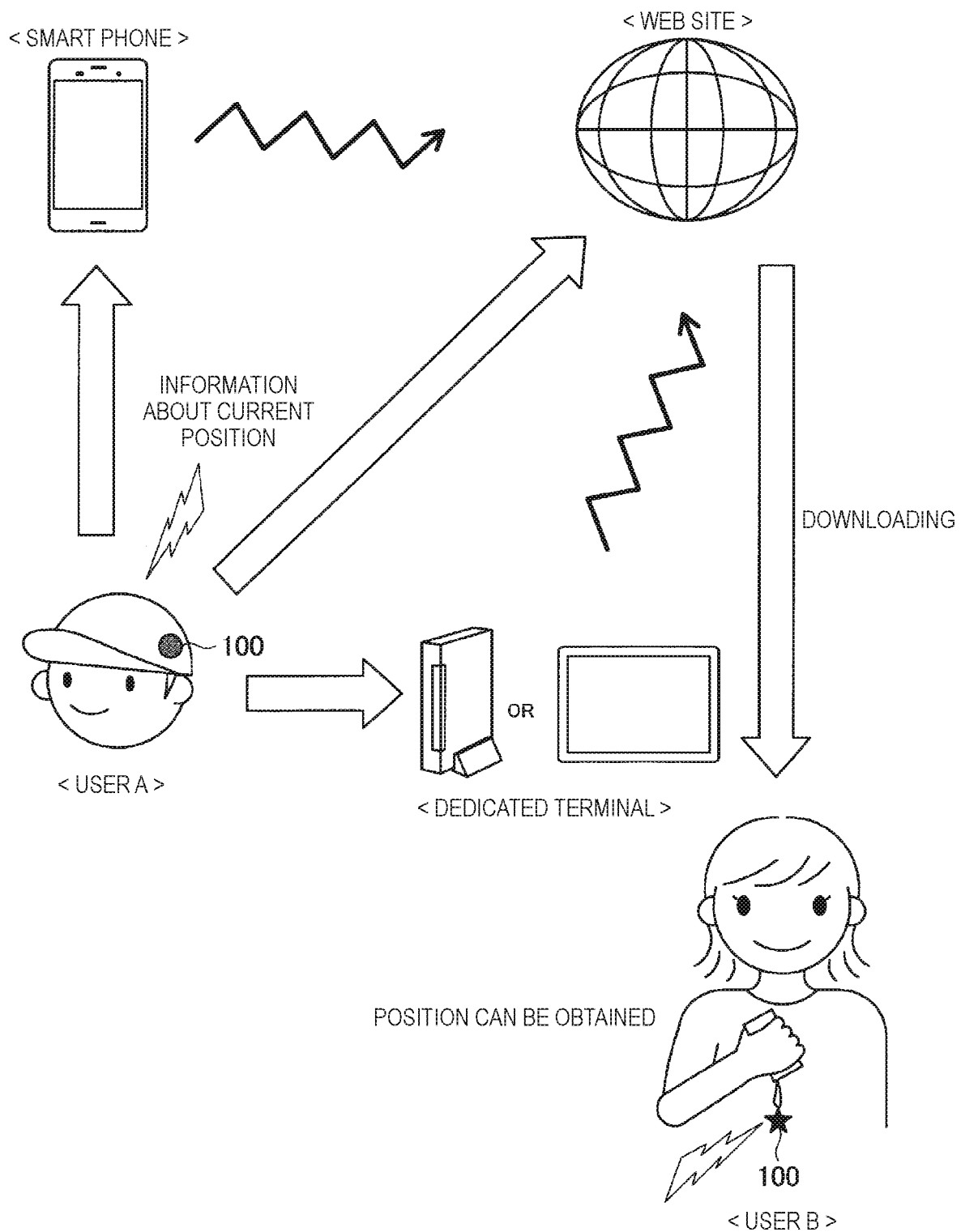
FIG. 4 is an explanatory diagram illustrating an example of another system that uses the wearable device according to the embodiment.

FIGS. 1 to 4 are diagrams for explaining an example of a system that uses a wearable device according to the embodiment. FIG. 1 illustrates an example of a form of a wearable device 100, and FIG. 2 illustrates an example of a power generation method. FIGS. 3 and 4 illustrate an example of a system that uses the wearable device 100.

The wearable device 100 according to the embodiment includes at least one power generation device. The wearable device 100 is a device that a user can wear or carry and can be configured in various forms. For example, the wearable device 100 may be a badge-type wearable device 100 that can be attached to a cap or the like, may be a strap-type wearable device 100 that can be attached to a mobile terminal device, or may be a bracelet-type wearable device 100 that the user can wear on their wrist as illustrated in FIG. 1. Alternatively, the wearable device 100 may be a necklace-type wearable device 100 that the user can wear on their neck, or may be a key holder-type wearable device 100 that can be attached to an object that the user carries, and is not limited to the forms exemplified herein.

As illustrated in FIG. 2, the power generation device provided in the wearable device 100 may be a device that generates power by using solar light, generates power by using a body temperature of the user, or generates power by using vibration that accompanies motion of the user, for example.

The wearable device 100 may be able to communicate with other wearable devices 100 by including a communication device, for example, along with the power generation device. For example, the wearable device 100 may be used as a beacon device. As illustrated in FIG. 3, the wearable device 100 that the user A wears and the wearable device 100 that the user B carries may be able to communicate with each other when the wearable devices 100 are in a range of 2 km, for example.

Specifically, if the communication devices are devices that are compatible with NFC (Near Field Communication), the two wearable devices 100 can transmit and receive information to and from each other when the wearable devices 100 are within several tens of cm of each other. If the communication devices are devices that are compatible with RFID (Radio Frequency Identifier), the two wearable devices 100 can transmit and receive information to and from each other when the wearable devices are within several meters of each other. If the communication devices are devices that are compatible with BLE (Bluetooth Low Energy: registered trademark), the two wearable devices 100 can transmit and receive information to and from each other when the wearable devices are within about 50 m of each other. Furthermore, if the communication devices are devices that are compatible with a frequency band of 920 MHz, the two wearable devices 100 can transmit and receive information to and from each other when the wearable devices are within about 2 km of each other.

If the wearable devices 100 include communication devices with the Internet as illustrated in FIG. 4, or if the wearable devices 100 include communication devices with smart phones or dedicated terminal devices capable of communicating with the Internet, the two wearable devices 100 can transmit and receive information to and from each other via the Internet. For example, the user B can obtain information about the position of the user A by causing the wearable device 100 that the user B carries to receive information of the current position of the user A that is transmitted by using electric power generated by the wearable device 100 that the user A wears.

Figure 5:
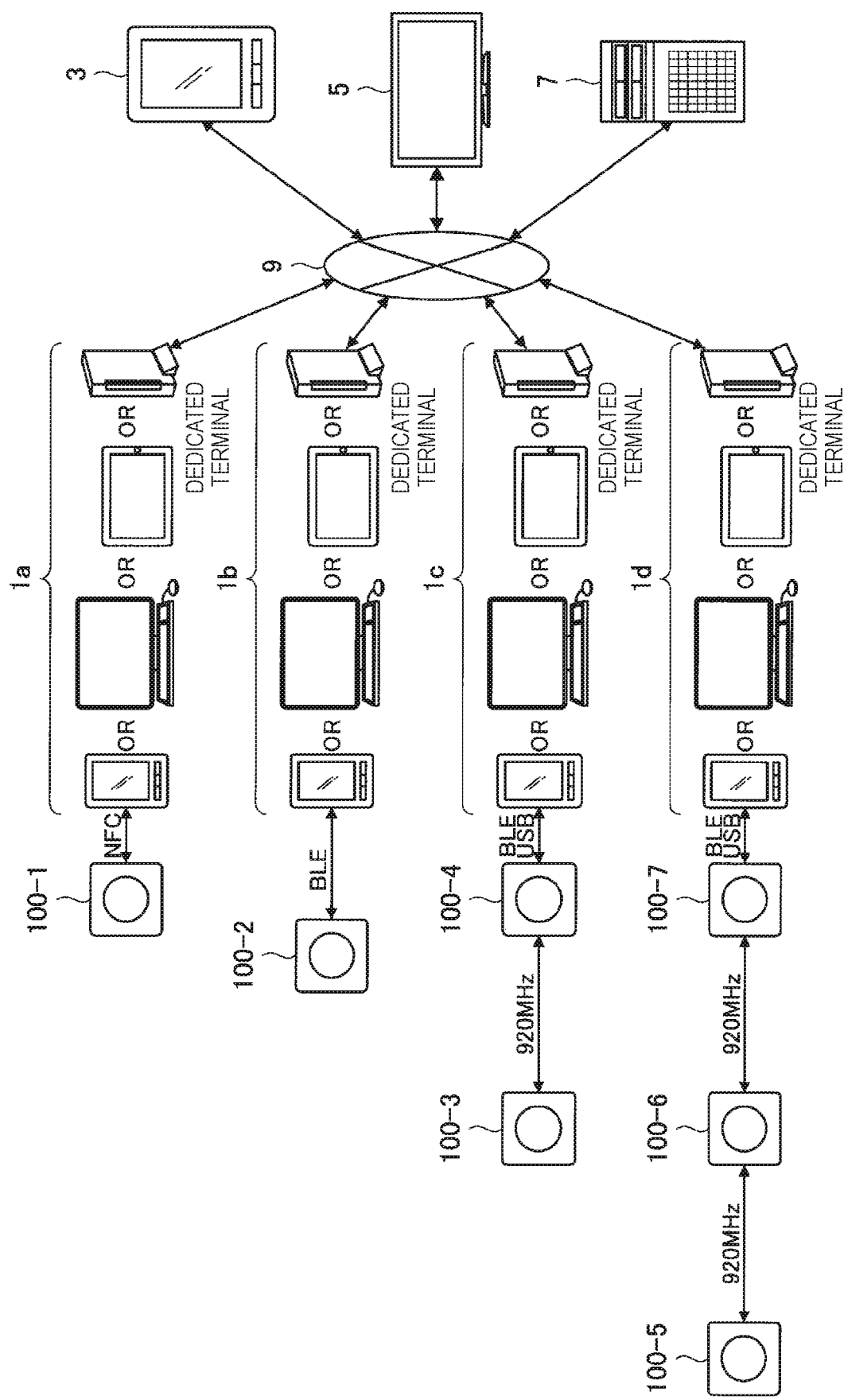
FIG. 5 is an explanatory diagram illustrating an example of still another system that uses the wearable device according to the embodiment.

Furthermore, a method in which the wearable devices 100 connect to a network can take various forms as illustrated in FIG. 5. For example, wearable devices 100-1 and 100-2 may be connected to a network 9 via smart phones, personal computers, or dedicated terminal machines 1a and 1b by communication means such as NFC or BLE. If a wearable device 100-3 is located at a position far from a smart phone 1c or the like, the wearable device 100-3 may transmit and receive information to and from another wearable device 100-4 connected to the smart phone 1c or the like capable of communicating with the network 9. If a wearable device 100-5 is located at a yet longer distance, the wearable device 100-5 may transmit and receive information to and from another wearable device 100-7, which is connected to a smart phone 1d or the like capable of communicating with the network 9, via a wearable device 100-6 that functions as a relay machine.

An appropriate smart phone 3, personal computer 5, server device 7, and the like may be connected to the network 9, and the smart phone 3, the personal computer 5, the server device 7, and the like may be able to receive information transmitted from the respective wearable devices 100. In addition, the wearable device 100 according to the embodiment may be used in various aspects.

2-2. System Configuration Example

Next, a system configuration example of the wearable device 100 according to the embodiment will be described. The wearable device 100 according to the embodiment includes at least one power generation device, and an electrical storage device, a computation device, a storage device, a communication device, and other appropriate devices may be configured by a single body or a modularized unit block of a combination of two or more devices. The wearable device 100 is configured as a wearable device with the power generation device mounted thereon by arbitrarily coupling such unit blocks. In the wearable device 100 according to the embodiment, the power generation device can be arranged at an appropriate position depending on the type thereof.

2-2-1. Example of Using Individual Computation Devices

Figure 6:
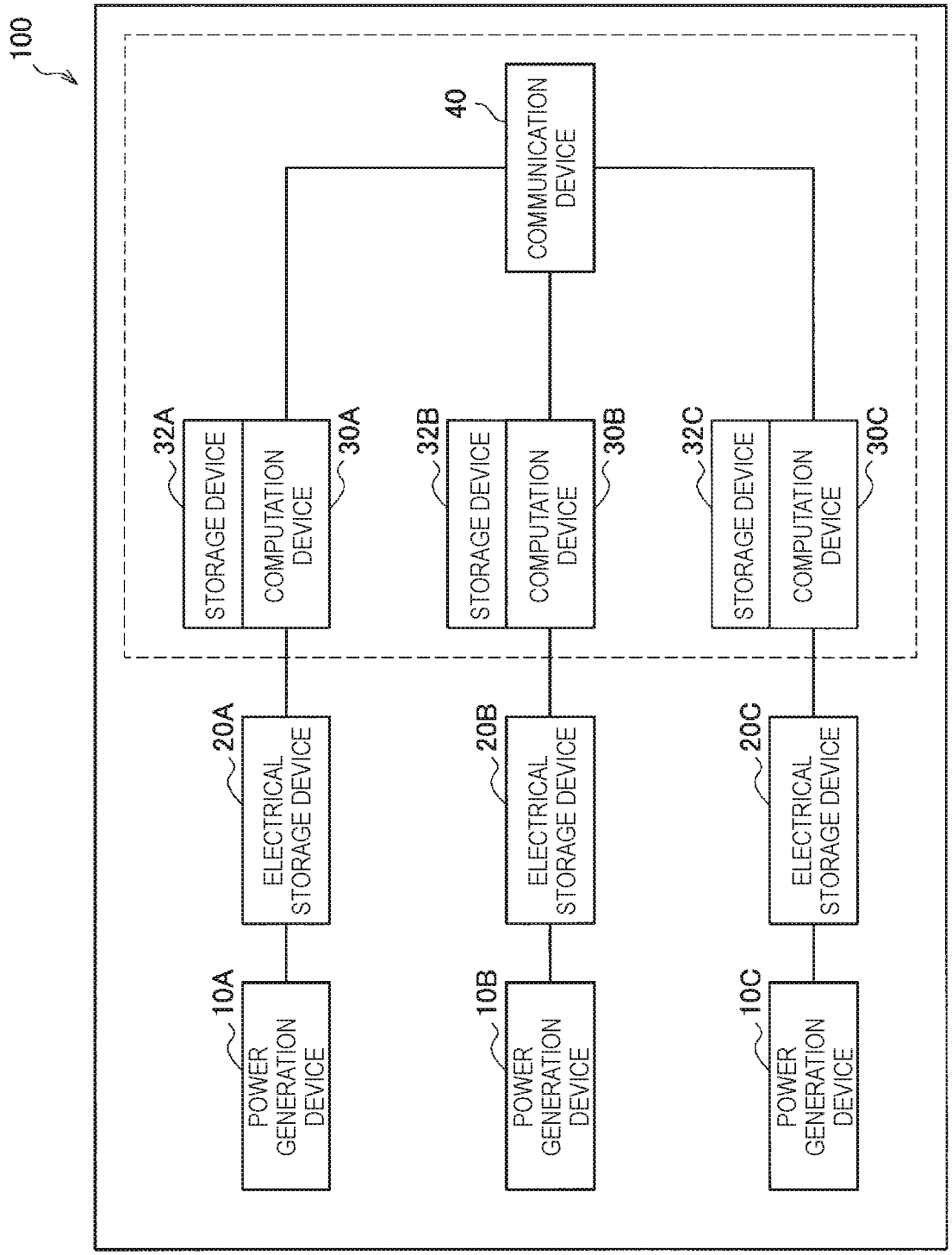
FIG. 6 is a block diagram illustrating a system configuration example of the wearable device according to the embodiment.

FIG. 6 is a block diagram illustrating an example of a system configuration of the wearable device 100. The wearable device 100 illustrated in FIG. 6 includes three power generation devices 10A, 10B, and 10C, three electrical storage devices 20A, 20B, and 20C, three computation devices 30A, 30B, and 30C, three storage devices 32A, 32B, and 32C, and one communication device 40.

2-2-1-1. Power Generation Devices

As the power generation devices 10A, 10B, and 10C, one or more power generation devices are selected and used from among a vibration kinetic power generation device, a solar power generation device, a thermoelectric conversion power generation device, an oxygen battery, a radio wave power generation device or a near electromagnetic field power generation device, or a power transmission device (rectenna) using magnetic resonance, electromagnetic induction, or electric field coupling, for example. Power generation devices other than the types of the above examples may be used as the power generation devices 10A, 10B, and 10C. Although all the power generation devices 10A, 10B, and 10C may be the same type of power generation device, it is possible to generate power in various environments without replacing the power generation devices mounted if the power generation devices 10A, 10B, and 10C are different types of power generation device.

The vibration kinetic power generation device is configured by using an electrostatic-type, electromagnetic-type, inverse magnetostriction-type, or a piezoelectric-type power generation element, for example, and generates power by using vibration energy or kinetic energy. The solar power generation device is configured by using a solar battery, for example, and generates power by using solar light. The thermoelectric conversion power generation device is configured by using a power generation element that uses a Seebeck effect or a Thomson effect, a thermionic power generation element, or a thermomagnetic power generation device, for example, and generates power by using at least one of a body temperature and an ambient temperature. The oxygen battery generates power by using oxygen in the air, for example.

The radio wave power generation device generates power by using a radio wave of Wi-Fi or a terrestrial digital wave, for example. The near electromagnetic field power generation device generates power by using an electromagnetic field of a near field, for example. The magnetic resonance power transmission device and the electromagnetic induction power transmission device are devices that use two coils as resonators and are designed such that a current flows through a coil on a power receiving side due to a current flowing through a coil on a power supply side. The electric field coupling power transmission device is a device configured such that a current flows through one of two facing electrode plates due to a high-frequency current flowing through the other electrode plate.

2-2-1-2. Electrical Storage Devices

As the electrical storage devices 20A, 20B, and 20C, one or more electrical storage devices are selected and used from among a capacitor, a condenser, or a secondary battery, or an electrical storage element which is a combination thereof, for example. The electrical storage devices 20A (20B or 20C) are connected to the power generation devices 10A (10B or 10C), respectively, and can store electric power generated by the power generation devices 10A (10B or 10C). If a purpose of the wearable device 100 is to transmit specific information such as whether or not power has been generated or position information of the wearable device 100 to another device by using electric power generated by the power generation devices 10A, 10B, and 10C, for example, the power storage capacity of the electrical storage devices 20A, 20B, and 20C may be relatively small though this depends on the purpose of use. However, electrical storage devices other than those of the above examples may be used as the electrical storage devices 20A, 20B, and 20C. All the types of the electrical storage devices 20A, 20B, and 20B may be the same or different from each other.

2-2-1-3. Computation Devices

The computation devices 30A, 30B, and 30B may be comparators, microcomputers, or the like with simple configurations, for example, though it depends on a purpose of use, and are not particularly limited. All the types of the computation devices 30A, 30B, and 30C may be the same or different from each other.

2-2-1-4. Storage Devices

The storage devices 32A, 32B, and 32C may be storage elements, such as RAMS (Random Access Memories), for example, which can temporarily store information. In the system configuration example of the wearable device 100 illustrated in FIG. 6, the storage device 32A (32B or 32C) is mounted on the computation device 30A (30B or 30C), and the storage device 32A (32B or 32C) and the computation device 30A (30B and 30C) configure one unit block. However, the storage devices 32A, 32B, and 32C may be independent unit blocks. If the computation devices 30A, 30B, and 30C are microcomputers, the storage devices 32A, 32B, and 32C may include storage elements, such as ROMs (Read Only Memories), which stores programs to be executed by the microcomputers. All the types of the storage devices 32A, 32B, and 32C may be the same or different from each other.

The storage devices 32A, 32B, and 32C may be volatile storage devices or non-volatile storage devices. If the storage devices 32A, 32B, and 32C are non-volatile storage devices, it is possible to save information to the storage devices before electric power, with which the electrical storage devices 20A, 20B, and 20C have been charged, runs out and to store the information and states before the electric power runs out. In this case, other wearable devices 100 and other reading devices can read the information and the like before the electric power runs out by using a communication technology, such as NFC or RFID, which can perform communication without supply of electric power.

2-2-1-5. Communication Device

The communication device 40 may be a wireless-type device that uses infrared rays, radio waves, or an electric field, for example. Specifically, the communication device 40 may be a device that can transmit and receive wavelength signals in a band from several hundreds of MHz to several GHz, representative examples of which include Wi-Fi, Zigbee (registered trademark), Bluetooth (registered trademark), Bluetooth Low Energy (registered trademark), ANT (registered trademark), ANT+ (registered trademark), and EnOcean Alliance (registered trademark). Alternatively, the communication device 40 may be a device that can perform near field communication, representative examples of which include NFC. The communication device 40 may include a storage device which is not illustrated in the drawing.

As illustrated by the dashed line in FIG. 6, the aforementioned computation devices 30A, 30B, and 30C may be realized by using computation devices provided in the communication device 40. If the wearable device 100 is connected to other wearable devices, the Internet, or the like via other devices installed in the surroundings thereof, the communication device 40 may be a wired-type device.

2-2-1-6. Other Devices

The wearable device 100 may include various devices in addition to the respective devices exemplified in FIG. 6 as needed. For example, the wearable device 100 may include rectifier circuits that rectify outputs of the power generation devices 10A, 10B, and 10C, regulators that boost or lower output voltages of the power generation devices 10A, 10B, and 10C, or charging circuits that control charging and discharging states of the electrical storage devices 20A, 20B, and 20C and monitor for abnormalities in the electrical storage devices 20A, 20B, and 20C, for example.

Although the three power generation devices 10A, 10B, and 10C, the three electrical storage devices 20A, 20B, and 20C, the three computation devices 30A, 30B, and 30C, and the three storage devices 32A, 32B, and 32C are provided in the system configuration example illustrated in FIG. 6, the numbers thereof are not limited to three, may be less than or equal to two, or may be more than or equal to four. In the system configuration example illustrated in FIG. 6, a plurality of devices appropriately selected from among the power generation devices 10A, 10B, and 10C, the electrical storage devices 20A, 20B, and 20C, the computation devices 30A, 30B, and 30C, the storage devices 32A, 32B, and 32C, and the communication device 40 may configure a unit block. For example, the power generation device 10A, the electrical storage device 20A, the computation device 30A, the storage device 32A, and the communication device 40 may be configured as a single unit block.

2-2-2. Example in which Common Computation Device is Used

Figure 7:
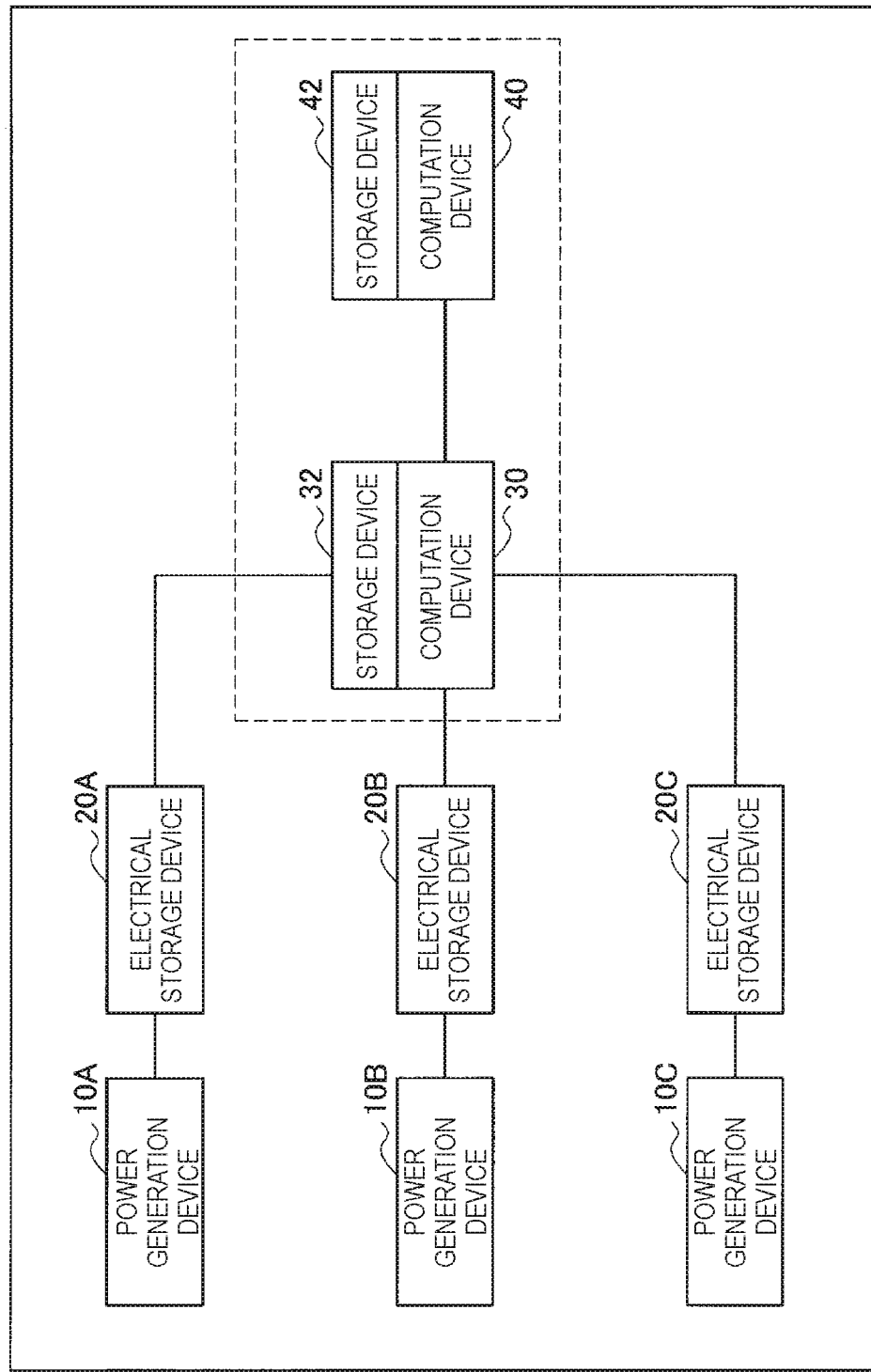
FIG. 7 is a block diagram illustrating another system configuration example of the wearable device according to the embodiment.

FIG. 7 is a block diagram illustrating another example of a system configuration of the wearable device 100. The wearable device 100 illustrated in FIG. 7 includes the three power generation devices 10A, 10B, and 10C, the three electrical storage devices 20A, 20B, and 20C, one computation device 30, and a storage device 32 that is provided in the computation device 30, and one communication device 40, and a storage device 42 that is provided in the communication device 40. The system configuration example illustrated in FIG. 7 is different from the system configuration example illustrated in FIG. 6 in that only one computation device 30 and only one storage device 32 that are common to all the power generation devices 10A, 10B, and 10C and the electrical storage devices 20A, 20B, and 20C are provided.

Basic functions of the respective devices in the system configuration example illustrated in FIG. 7 may be the same as those of the respective devices in the system configuration example illustrated in FIG. 6. The storage device 42 provided in the communication device 40 may be appropriately selected and used from among storage elements that can be used as the storage device 32 provided in the computation device 30. In the system configuration example illustrated in FIG. 7, the computation device 30 can also be realized by using a computation device provided in the communication device 40.

Although the three power generation devices 10A, 10B, and 10C and the three electrical storage devices 20A, 20B, and 20C are also provided in the system configuration example illustrated in FIG. 7, the numbers thereof are not limited to three, may be less than or equal to two, or may be greater than or equal to four. In the system configuration example illustrated in FIG. 7, a plurality of devices appropriately selected from among the power generation devices 10A, 10B, and 10C, the electrical storage devices 20A, 20B, and 20C, the computation device 30, the storage device 32, the communication device 40, and the storage device 42 may configure a unit block. For example, the power generation device 10A, the electrical storage device 20A, the computation device 30, the storage device 32, and the communication device 40 may be configured as a single unit block.

2-3-3. Example in which Common Electrical Storage Device is Used

Figure 8:
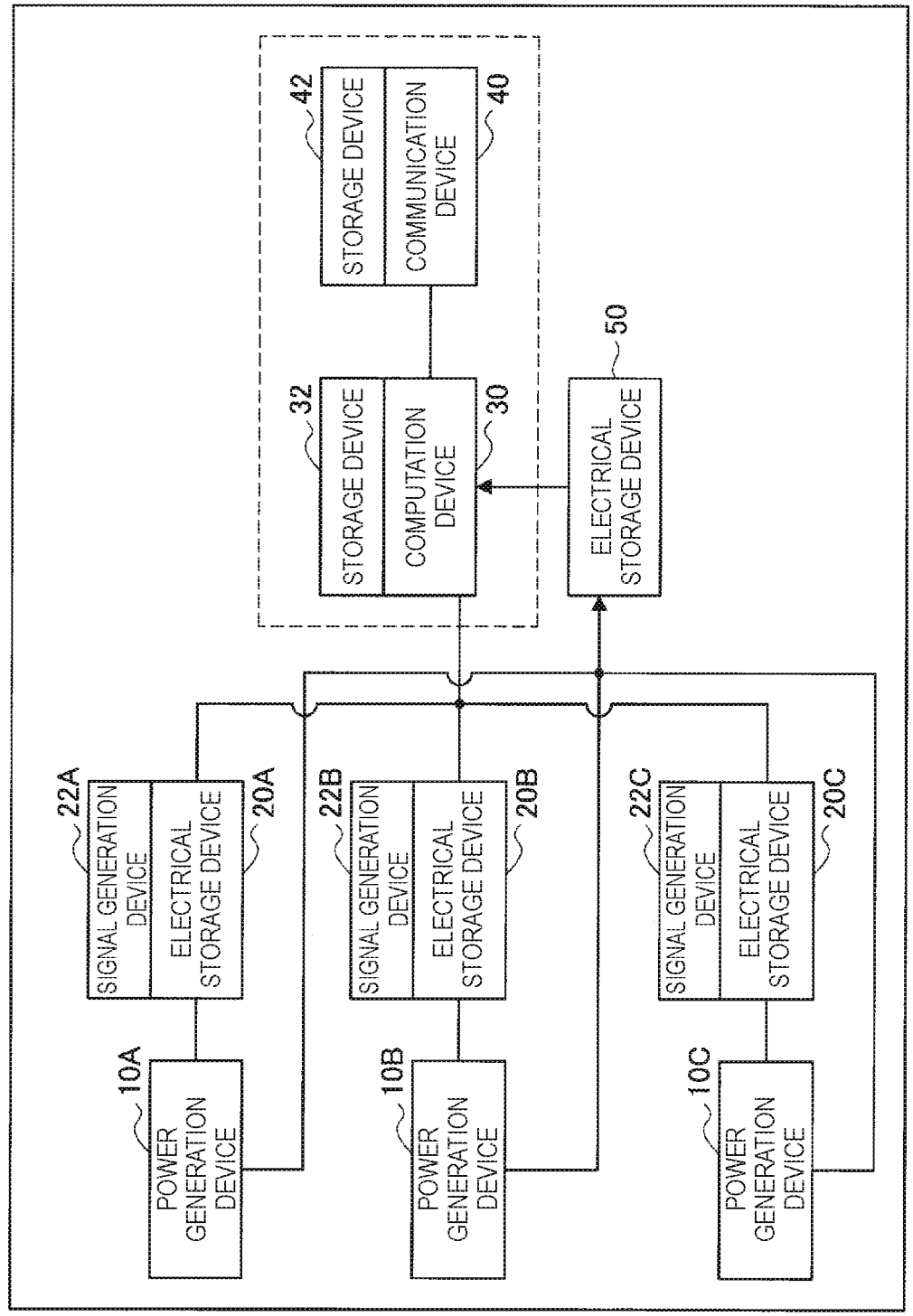
FIG. 8 is a block diagram illustrating another system configuration example of the wearable device according to the embodiment.

FIG. 8 is a block diagram illustrating still another example of a system configuration of the wearable device 100. The wearable device 100 illustrated in FIG. 8 includes the three power generation devices 10A, 10B, and 10C, the three electrical storage devices 20A, 20B, and 20C, three signal generation devices 22A, 22B, and 22C that are provided in the respective electrical storage devices 20A, 20B, and 20C, one computation device 30, the storage device 32 that is provided in the computation device 30, one communication device 40, the storage device 42 that is provided in the communication device 40, and an electrical storage device 50 that supplies electric power to the computation device 30 and the communication device 40.

The configuration example of the wearable device 100 illustrated in FIG. 8 is different from the configuration examples of the wearable device 100 illustrated in FIGS. 6 and 7 in that a part of the electric power generated by the power generation devices 10A, 10B, and 10C is stored in the electrical storage device 50 and that the computation device 30 and the communication device 40 are driven by the electric power stored in the electrical storage device 50.

Basic functions of the respective devices in the system configuration example illustrated in FIG. 8 may be the same as those of the respective devices in the system configuration example illustrated in FIG. 6. The electrical storage device 50 may be appropriately selected and used from among the electrical storage devices that can be used as the electrical storage devices 20A, 20B, and 20C connected to the power generation devices 10A, 10B, and 10C. However, since the electrical storage device 50 stores the electric power for driving the computation device 30 and the communication device 40, a secondary battery or the like with relatively large capacity may be used.

The electrical storage device 50 stores the remaining electric power after removing the electric power necessary for driving the signal generation devices 22A, 22B, and 22C in the electric power generated by the power generation devices 10A, 10B, and 10C. The electrical storage device 50 can more efficiently supply the generated electric power to the computation device 30 and the communication device 40 by accumulating the electric power other than the electric power necessary for the signal generation devices 22A, 22B, and 22C to generate signals.

Although the three power generation devices 10A, 10B, and 10C, the three electrical storage devices 20A, 20B, and 20C, and the three signal generation devices 22A, 22B, and 22C are also provided in the system configuration example illustrated in FIG. 8, the numbers thereof are not limited to three, may be less than or equal to two, or may be greater than or equal to four. In the system configuration example illustrated in FIG. 8, a plurality of devices appropriately selected from among the power generation devices 10A, 10B, and 10C, the electrical storage devices 20A, 20B, and 20C, the signal generation devices 22A, 22B, and 22C, the computation device 30, the storage device 32, the communication device 40, and the storage device 42 can also configure a unit block. For example, the power generation device 10A, the electrical storage device 20A, the signal generation device 22A, the computation device 30, the storage device 32, and the communication device 40 may be configured as a single unit block.

The basic configuration of the wearable device 100 according to the embodiment of the present disclosure was described hitherto. Hereinafter, specific embodiments in which the wearable device 100 provided with a power generation device can be configured by arbitrarily coupling a modularized unit block of a single body of each device or a combination of a plurality of devices will be described.

3. First Embodiment

A wearable device 100A according to a first embodiment of the present disclosure is a device that can be used as a part of a belt part of a wrist watch, for example. In the wearable device 100A according to the embodiment, electric connection to a flexible circuit board can easily be secured while a user arbitrarily selects each device configured by a modularized unit block. Although an example in which the wearable device 100A according to the embodiment is used in a belt part of a wrist watch will be described below, the wearable device 100A may be used not only in a wrist watch but also in another device such as an accessory by being coupled thereto.

3-1. Overall Configuration

Figure 9:
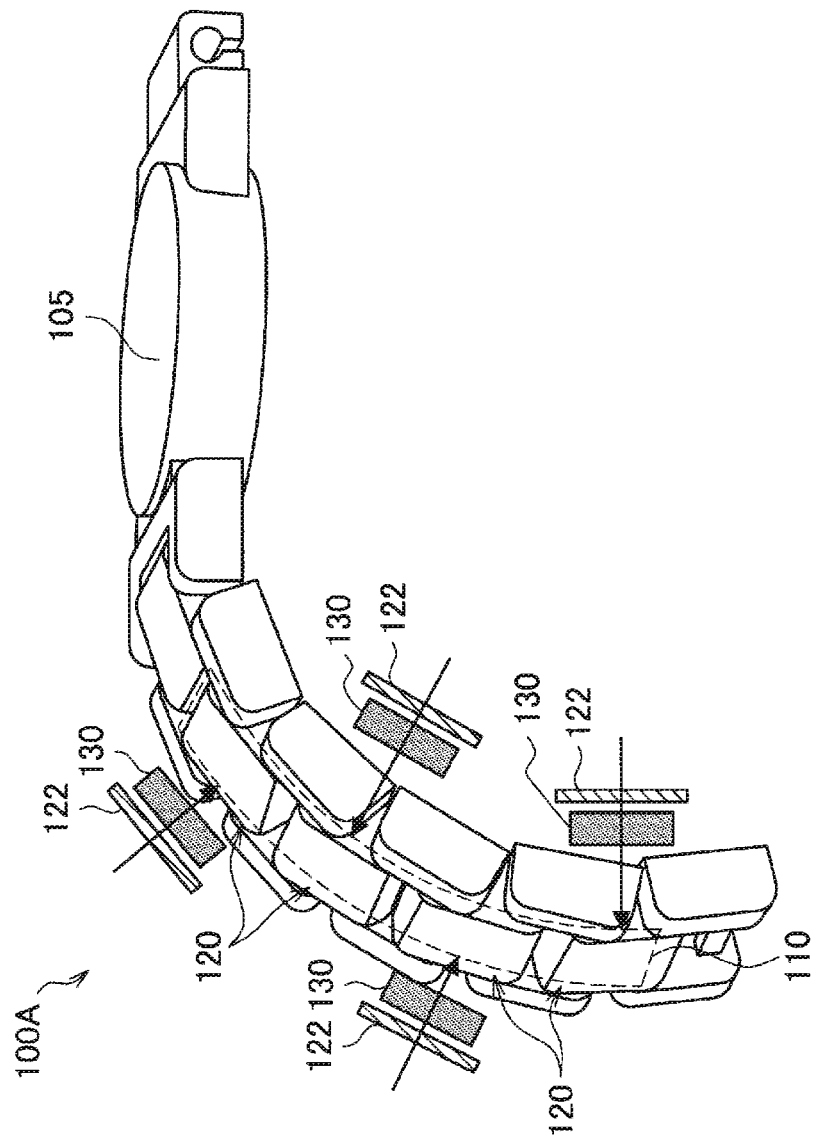
FIG. 9 is a perspective diagram illustrating a wearable device according to a first embodiment of the present disclosure.
Figure 10:
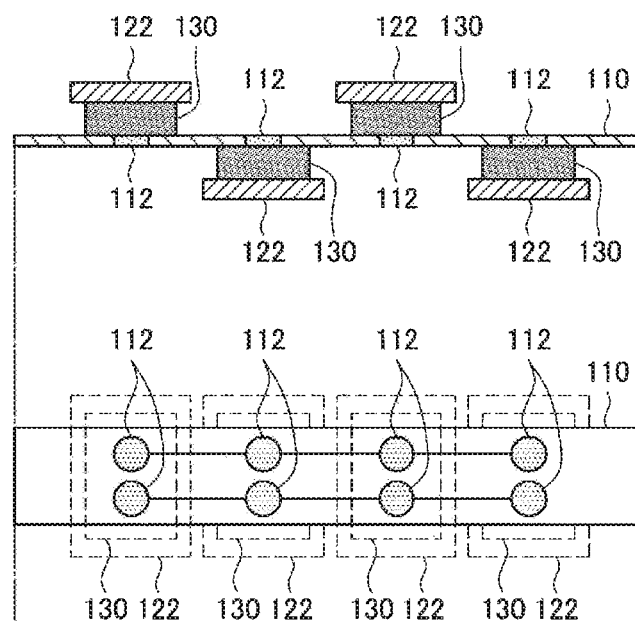
FIG. 10 is an explanatory diagram illustrating a unit block connection method of the wearable device according to the embodiment.

FIGS. 9 and 10 are explanatory diagrams illustrating an outline of the overall configuration of the wearable device 100A according to the embodiment. FIG. 9 is a diagram schematically illustrating a state where the wearable device 100A is coupled as a part of a belt coupled to a main body part 105 of the wrist watch. FIG. 10 is a sectional view and a planar view for explaining a connection method between a flexible circuit board 110 and unit blocks 130. Although the example of the wearable device 100A in which four so-called pieces 120 of the belt are coupled will be described in the embodiment, the number of pieces 120 coupled is not limited to four, may be less than or equal to three, or may be greater than or equal to five.

As illustrated in FIG. 9, the unit blocks 130 which are the aforementioned respective modularized devices are held inside the so-called pieces 120 of the belt and are covered with covers 122 in such a wearable device 100A. The flexible circuit board 110 is disposed across all the pieces 120 that configure the wearable device 100A. The unit blocks 130 installed in the pieces 120 are held inside the pieces 120 such that the terminals of the unit blocks 130 are electrically connected to the electric connection units of the flexible circuit board 110. That is, the terminals of the unit blocks 130 and the electric connection units of the flexible circuit board 110 are electrically connected to each other without soldering in the wearable device 100A according to the embodiment.

As illustrated in FIG. 10, the unit blocks 130 are electrically connected to electric connection units 112 provided in the flexible circuit board 110. The electric connection units 112 may be through-holes such that the respective unit blocks 130 can be connected to both the front and rear sides of the flexible circuit board 110. Although the flexible circuit board 110 is illustrated in a state of not being bent or curved in FIG. 10, the flexible circuit board 110 may be brought into a bent or curved state if the flexible circuit board 110 is disposed across the plurality of pieces 120.

In the embodiment, the unit blocks 130 are accommodated inside the pieces 120 and are further covered with covers 122 such that the terminals of the unit blocks 130 are pressed against the electric connection units of the flexible circuit board 110. In this manner, the terminals of the unit blocks 130 and the electric connection units of the flexible circuit board 110 are reliably electrically connected.

Although a constituent material of the pieces 120 is not particularly limited, metals such as aluminum or stainless steel or resin may be used, for example. In addition, all the pieces 120 may be made of the same constituent material, or a part or the entirety of the pieces 120 may be made of different constituent materials. In particular, a piece 120 that accommodates a thermoelectric conversion power generation device may be formed by using a material with high heat conductivity, such as a metal.

3-2. Arrangement Example

Figure 11:
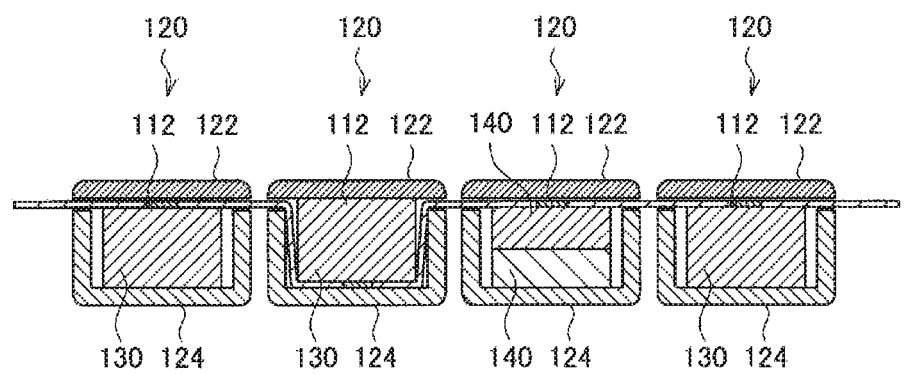
FIG. 11 is an explanatory diagram illustrating a unit block arrangement example of the wearable device according to the embodiment.
Figure 12:
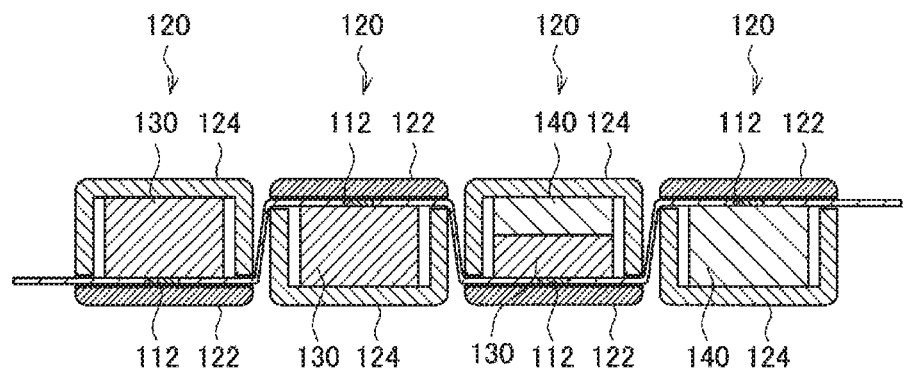
FIG. 12 is an explanatory diagram illustrating another unit block arrangement example of the wearable device according to the embodiment.
Figure 13:
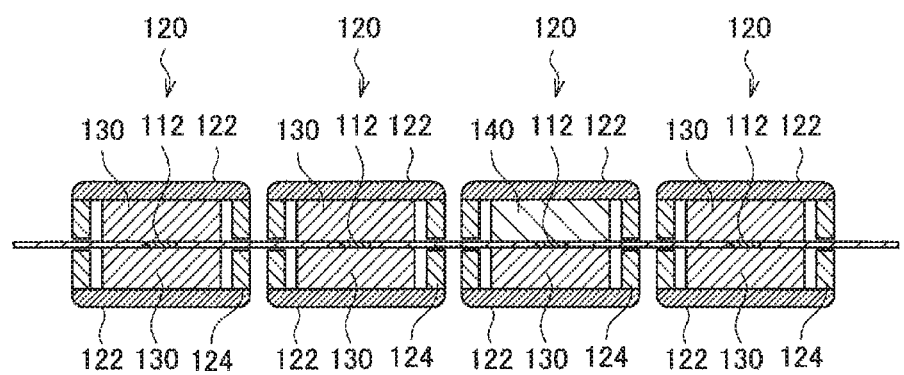
FIG. 13 is an explanatory diagram illustrating another unit block arrangement example of the wearable device according to the embodiment.

FIGS. 11 to 13 are sectional views illustrating arrangement examples of the unit blocks 130 and the flexible circuit board 110 in the wearable device 100A according to the embodiment. In the following description, case bodies 124 correspond to holding members according to the present disclosure.

In the examples illustrated in FIGS. 11 and 12, the unit blocks 130 are accommodated in the case bodies 124 in one of directions of from in front of or behind (the upward and downward directions in the drawing) the case bodies 124 of the pieces 120, and covers 122 are further attached thereto. The flexible circuit board 110 passes between the case bodies 124 and the covers 122 and is disposed across all the pieces 120. The unit blocks 130 of the power generation device, the electrical storage device, the computation device, the storage device, or the communication device may have substantially the same size and shape, and all the unit blocks 130 may be positioned in the case bodies 124 of the pieces 120 in the same manner. Alternatively, if the thickness (the width in the vertical direction in the drawing) of some unit blocks 130 is thin, the total thickness in the case body 124 may be adjusted by combining the unit block 130 with a dummy block 140.

In each piece 120, the flexible circuit board 110 is arranged over the unit block 130 accommodated in the case body 124, or the unit block 130 is arranged over the flexible circuit board 110 disposed in the case body 124. By further attaching the cover 122 thereto, the terminal, which is not illustrated in the drawing, of the unit block 130 is pressed against the electric connection unit 112 of the flexible circuit board 110. In this manner, the terminal of each unit block 130 is electrically connected to the electric connection unit 112 of the flexible circuit board 110.

In the example illustrated in FIG. 11, the covers 122 are positioned on the same one of the front and rear sides of all the pieces 120 (on the upper side in FIG. 11). The flexible circuit board 110 is disposed between the unit blocks 130 and the covers 122 except for the second piece 120 from the left side. For the second piece 120 from the left side, the flexible circuit board 110 passes between the case body 124 and the cover 122, enters the case body 124, and is disposed between the unit block 130 and the case body 124 inside the case body 124.

In the example illustrated in FIG. 12, locations where the unit blocks 130 and the flexible circuit board 110 are electrically connected are alternately arranged one by one on front and rear sides of the aligned pieces 120. However, the case bodies 124 and the covers 122 may be configured as common constituent components in the examples illustrated in FIGS. 11 and 12. That is, the respective pieces 120 may be coupled such that the covers 122 may be arranged at a desired position on either the front or rear sides of the respective pieces 120.

In the example illustrated in FIG. 13, the flexible circuit board 110 penetrates through the center in the forward and rearward direction (the vertical direction in the drawing) of the case bodies 124 of the pieces 120. The unit blocks 130 of the power generation device, the electrical storage device, the computation device, the storage device, and the communication device have substantially the same size and shape, and all the unit blocks 130 are positioned in the same manner in the case bodies 124 of the pieces 120.

In the respective pieces 120, the unit blocks 130 are respectively accommodated in the case bodies 124 on both the front and rear sides of the flexible circuit board 110 and are respectively covered with the covers 122. In this manner, the respective unit blocks 130 are pressed against the front and rear surfaces of the flexible circuit board 110, and the flexible circuit board 110 is pinched by two unit blocks 130 in each of the case bodies 124. In this manner, the terminals, which are not illustrated in the drawing, in the respective unit blocks 130 are electrically connected to the electric connection units 112 of the flexible circuit board 110. If a plurality of unit blocks 130 are accommodated in one piece 120, the electric connection units 112 of the flexible circuit board 110 may be individually provided.

The dummy block 140 is a pseudo block that is configured to have the same size, shape, and the like as those of the unit blocks 130, and is accommodated in the case body 124 instead of the unit blocks 130 if the number of unit blocks 130 used in the wearable device 100A is an odd number. This compensates for electric connection between the unit blocks 130 accommodated on the side opposite to the flexible circuit board 110 and the flexible circuit board 110 in the same case body 124.

In the respective configuration examples illustrated in FIGS. 11 to 13, on which of the front and rear sides the attachment positions of the covers 122 of the respective pieces 120 are to be located may be determined in accordance with the unit blocks 130 accommodated in the respective pieces 120. For example, a solar power generation device can efficiently generate power by being installed on the front surface of the wearable device 100A that can be irradiated with solar light. Therefore, the piece 120 that accommodates a solar power generation device may be directed and coupled such that the flexible circuit board 110 is not positioned on the front side. In this case, a light transmission unit may be provided on the front side of the cover 122 or 124.

A thermoelectric conversion power generation device that uses a body temperature can efficiently generate power by being installed at a position near a body surface in the wearable device 100A. Therefore, the piece 120 that accommodates a thermoelectric conversion power generation device may be directed and coupled such that the flexible circuit board 110 is not located on the rear side.

In the configuration examples illustrated in FIGS. 11 to 13, appropriately selected unit blocks 130 can be arranged at appropriate positions on either the front or rear sides of the pieces 120 without replacing the flexible circuit board 110. At this time, an unnecessary piece 120 may accommodate the dummy block 140. In contrast, the pieces 120 may be arranged in accordance with the number of unit blocks 130, and the flexible circuit board 110 may be prepared in accordance with the types or arrangement of the respective unit blocks 130.

3-3. Configuration Example of Pieces

Figure 14:
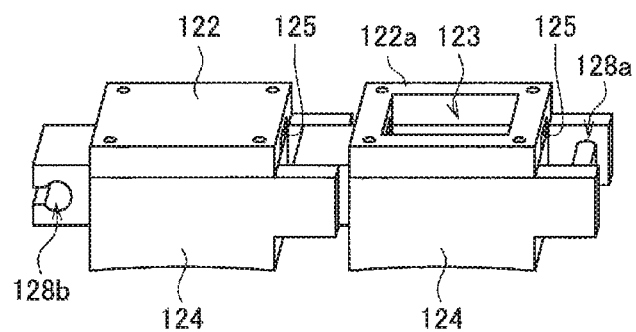
FIG. 14 is an explanatory diagram illustrating a configuration example of pieces of a wearable device according to the embodiment.
Figure 15:
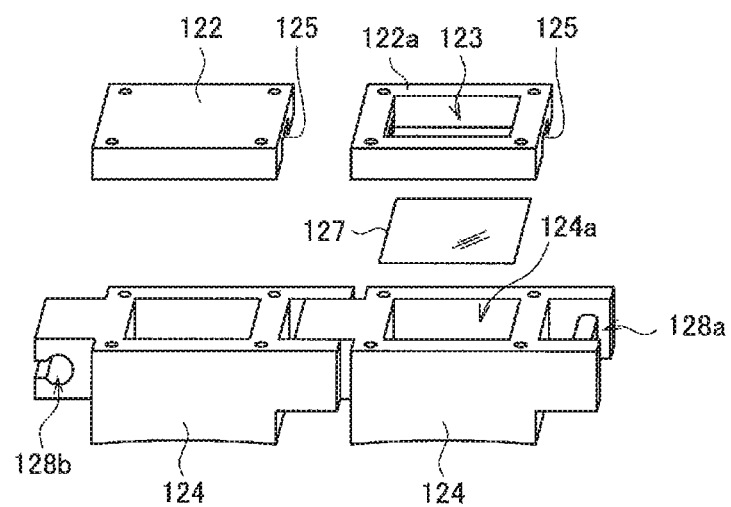
FIG. 15 is a perspective diagram illustrating a configuration example of pieces of a wearable device according to the embodiment.
Figure 16:
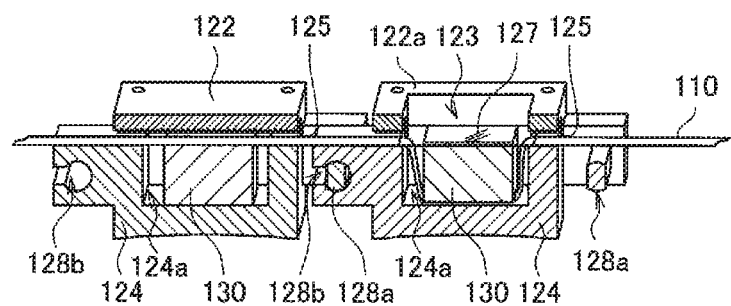
FIG. 16 is a sectional view illustrating pieces of the wearable device according to the embodiment.
Figure 17:
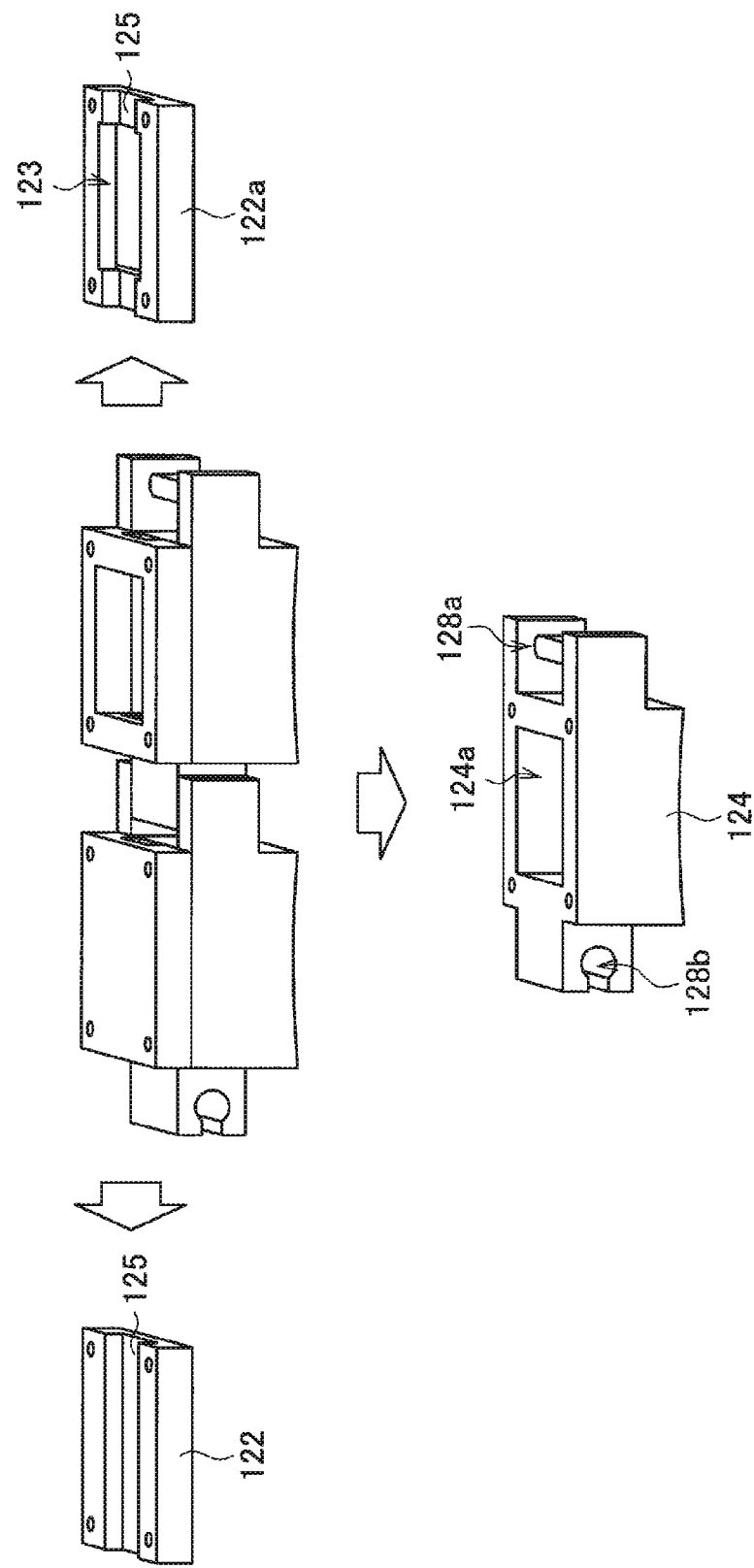
FIG. 17 is an exploded perspective view of a piece of the wearable device according to the embodiment.
Figure 18:
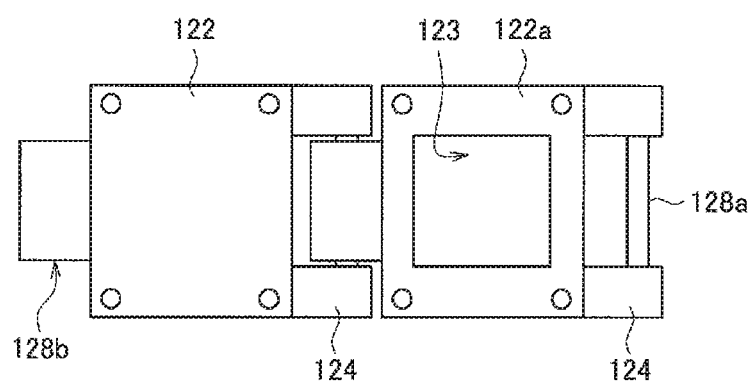
FIG. 18 is a diagram of pieces of the wearable device according to the embodiment when viewed from a side of a cover.
Figure 19:
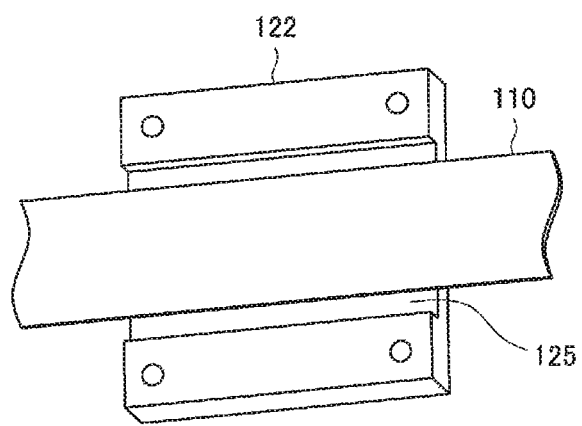
FIG. 19 is a perspective view illustrating a configuration example of the cover.

Next, a configuration example of the pieces 120 that enable the wearable device 100A to be used in the aforementioned arrangement will be described. FIGS. 14 to 19 are explanatory diagrams illustrating configuration examples of the pieces 120. FIG. 14 is a perspective view illustrating a state where two pieces 120 are coupled to each other, FIG. 15 is a perspective view illustrating a situation in which the covers 122 are removed from the case bodies 124 of the pieces 120, and FIG. 16 is a sectional view of two pieces 120 that accommodate the unit blocks 130. FIG. 17 is an exploded perspective view of the piece 120, FIG. 18 is an upper view of two pieces 120 when viewed from the side of the covers 122, and FIG. 19 is a perspective view of the cover 122 when viewed from the rear side.

In the pieces 120 used for the wearable device 100A according to the embodiment, the case bodies 124 with one shape are used. Each case body 124 includes an accommodation unit 124a that accommodates the unit block 130 or the dummy block 140, and a coupling pin 128a and a pin receiving unit 128b for coupling the pieces 120. The accommodation unit 124a may be formed into a rectangular concave portion with a depth that coincides with or approximates to the height (thickness) of the unit block 130, for example. The coupling pin 128a and the pin receiving unit 128b are provided at both ends of the case body 124 in a predetermined direction. Two case bodies 24 are coupled to each other by the coupling pin 128a of one case body 124 being fitted into the pin receiving unit 128b of another case body 124.

Covers 122 and 122a are attached to a surface, from which the accommodation unit 124a is opened, of the case body 124 with a screw, a bolt, or the like which is not illustrated in the drawing. The cover 122a of the two covers 122 and 122a includes an opening 123 in which an area corresponding to the accommodation unit 124a of the case body 124 is open while the cover 122 does not include such an opening. The cover 122a with the opening 123 is attached to the case body 124 that accommodates a solar power generation device, for example, the opening 123 functions as a light transmission unit, and the solar light is made to reach the unit block (solar power generation device) 130.

Figure 20:
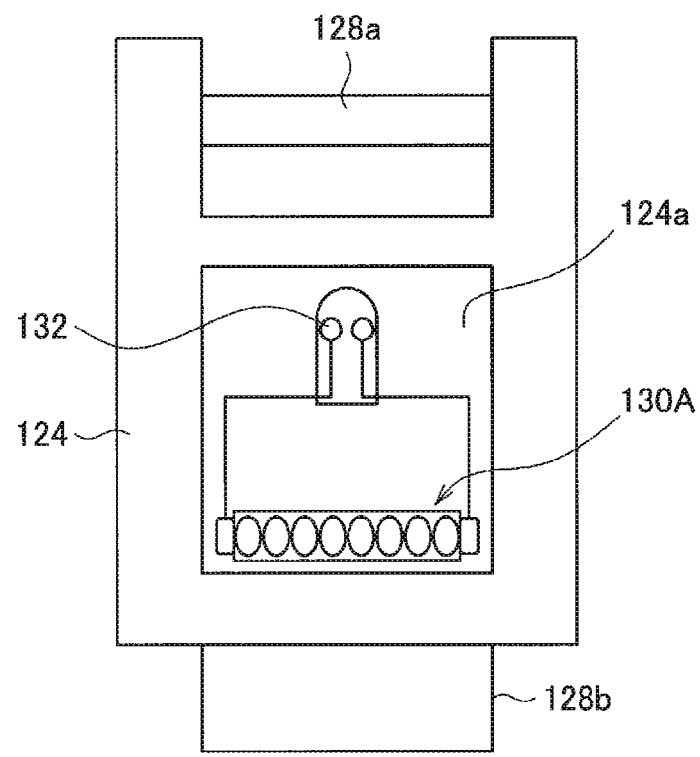
FIG. 20 is a perspective view illustrating an example in which a solar battery module is accommodated in a case body.

FIG. 20 is a diagram of the case body 124 in which a solar battery module (solar power generation device) 130A is accommodated in the accommodation unit 124a when viewed from the surface from which the accommodation unit 124a is opened. Even when the cover 122a with the opening 123 is attached to the case body 124, solar light reaches the solar power generation device 130A through the opening 123 and solar power generation can be performed.

Returning again to the description of the configuration example of each piece 120, a light-transmitting cover 127 is provided between the cover 122a and the case body 124 if the cover 122a with the opening 123 is used. Also, a cover 122 with no opening may be attached to the case body 124 that accommodates a unit block 130 to which external light is not required to reach.

The covers 122 and 122a have grooves 125, which extend in a coupling direction of the pieces 120, on surfaces that face the case bodies 124. Therefore, a clearance is formed between the cover 122 and the case body 124 when the cover 122 is attached to the case body 124. The flexible circuit board 110 can enter the case body 124 via such a clearance. Such grooves 125 may be provided on the side of the case bodies 124.

For the piece 120 to which the cover 122a with the opening 123 is attached, the flexible circuit board 110 is bent at the case body 124 and is disposed between the bottom surface of the accommodation unit 124a of the case body 124 and the unit block 130. In this manner, the flexible circuit board 110 does not block irradiation of the unit block 130 with the solar light. For the piece 120 to which the cover 122 with no opening is attached, the flexible circuit board 110 is disposed between the cover 122 and the unit block 130 without being bent in the case body 124.

The covers 122 and 122a press the unit blocks 130 against the bottom surface side of the accommodation units 124a by the respective covers 122 and 122a being attached to the case bodies 124. In this manner, the unit blocks 130 and the flexible circuit board 110 are pressed against each other, and electric connection between the terminals, which are not illustrated in the drawing, of the unit blocks 130 and the electric connection units 112 of the flexible circuit board 110 is secured.

By using such pieces 120, it is possible to couple appropriate numbers of pieces 120 and to obtain the wearable device 100A provided with a desired number of unit blocks 130. Also, it is possible to electrically connect the terminals of the unit blocks 130 and the electric connection units 112 of the flexible circuit board 110 by accommodating the unit blocks 130 provided in the respective pieces 120 in the case bodies 124 and then attaching the covers 122 and 122a to the case bodies 124. Therefore, it is possible to realize a desired wearable device 100A by replacing the unit blocks 130 or replacing the covers 122 and 122a or the flexible circuit board 110 used with the unit blocks 130 in accordance with purposes.

Figure 21:
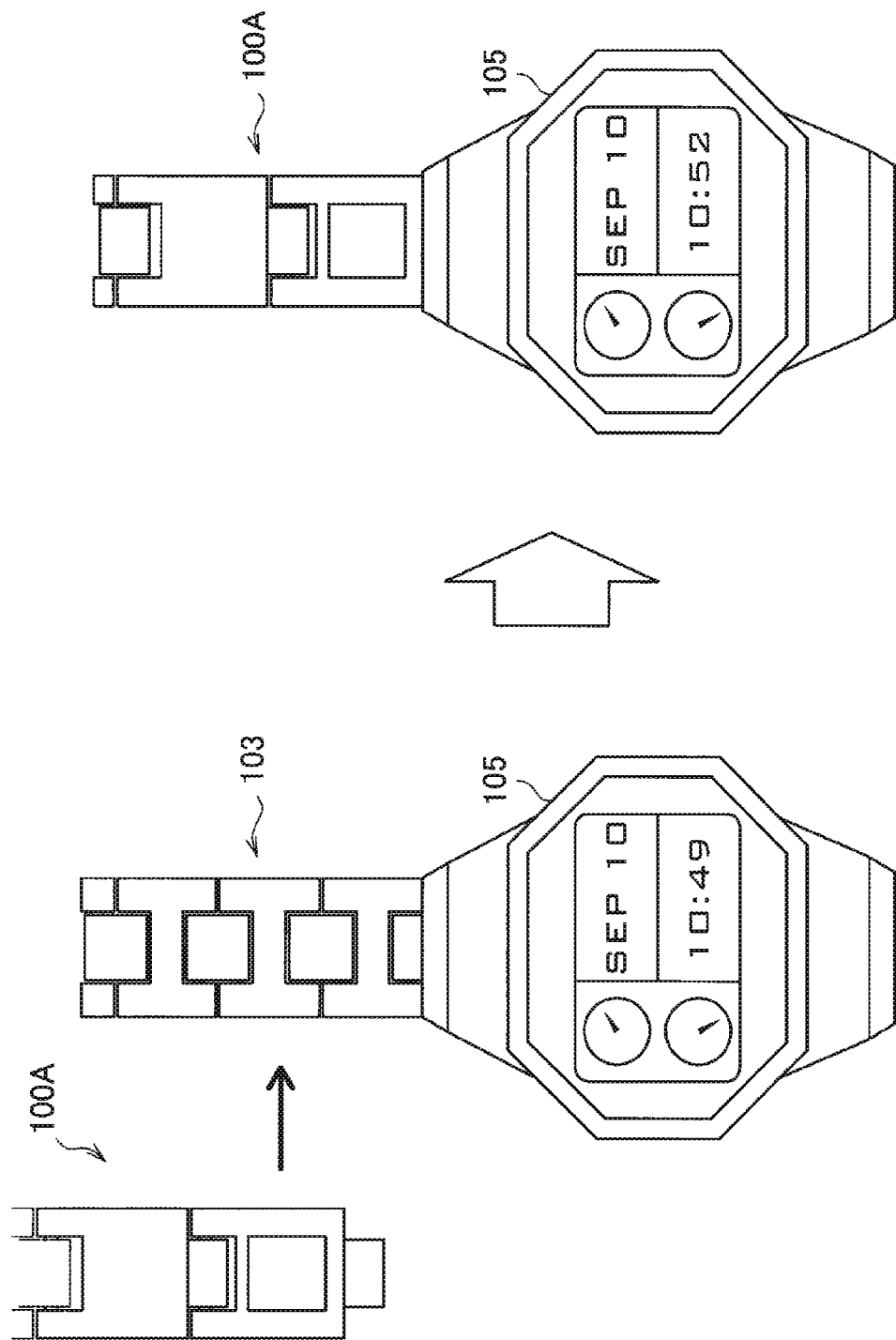
FIG. 21 is an explanatory diagram illustrating an example in which the wearable device according to the embodiment is applied to a belt of a wrist watch.

Such a wearable device 100A may be replaced with a belt part 103 of a wrist watch and may be coupled to the main body part 105 of the wrist watch as illustrated in FIG. 21. At this time, an attachment for adaption to the coupling part of the main body part 105 of the wrist watch may be used. Also, the flexible circuit board 110 may not be disposed across the entire belt part of the wrist watch, and the flexible circuit board 110 may be disposed at least in a range of the pieces 120 that accommodates the unit blocks 130. At this time, pieces for adjusting the length (length adjustment member) may be coupled in a range other than that of the pieces 120 that accommodate the unit blocks 130. The pieces for adjusting the length may be members formed into integrated members in which the case bodies and the covers are not separate while the outer shape and the size thereof are designed to be the same as those of the pieces 120 that accommodate the unit blocks 130, for example.

3-4. Effects of First Embodiment

As the wearable device 100A according to the embodiment, it is possible to obtain a desired wearable device 100A with the power generation devices mounted thereon by arbitrarily selecting and connecting the modularized unit blocks 130 of the device as described above. Since such a wearable device 100A includes the power generation devices, it is possible to eliminate effort or stress due to charging. Since such a wearable device 100A can be used as a belt part of a wrist watch, an accessory, or the like, it is possible to wear the wearable device 100A with no uncomfortable feeling and to eliminate stress during wearing. Furthermore, since the wearable device 100A has a belt-like appearance, it is possible to wear the wearable device 100A with no uncomfortable feeling due to the appearance thereof.

In the wearable device 100A according to the embodiment, even a unit block 130 of a device, such as a solar power generation device or a thermoelectric conversion power generation device, that limits the arrangement position can be electrically connected by using both surfaces of the flexible circuit board 110. Therefore, it is possible to select an appropriate power generation device in accordance with a user purpose, an attachment position, an environment of use, or the like and to mount the power generation device on the wearable device 100A. In the wearable device 100A according to the embodiment, it is possible to appropriately increase or decrease the number of unit blocks 130 of the devices to be mounted and to enhance a degree of freedom when the wearable device 100A is configured. For example, it is possible to obtain the wearable device 100A that can generate power in various environments of use by designing the wearable device 100A on which various types of power generation device can be mounted.

If the wearable device 100A is to be used for a relatively long period of time after an arbitrary power generation device is selected and the wearable device 100A is configured once, the terminal the unit block 130 and the electric connection unit 112 of the flexible circuit board 110 may be soldered. It is possible to enhance reliability of the electric connection for long-term use in this manner.

4. Second Embodiment

A wearable device 100B according to a second embodiment of the present disclosure is a device that can be used as a belt part of a wrist watch, an accessory, or the like in the same manner as the wearable device 100A according to the first embodiment. Hereinafter, differences between the wearable device 100B according to this embodiment and the wearable device 100A according to the first embodiment will be mainly described.

4-1. Configuration Example

Figure 22:
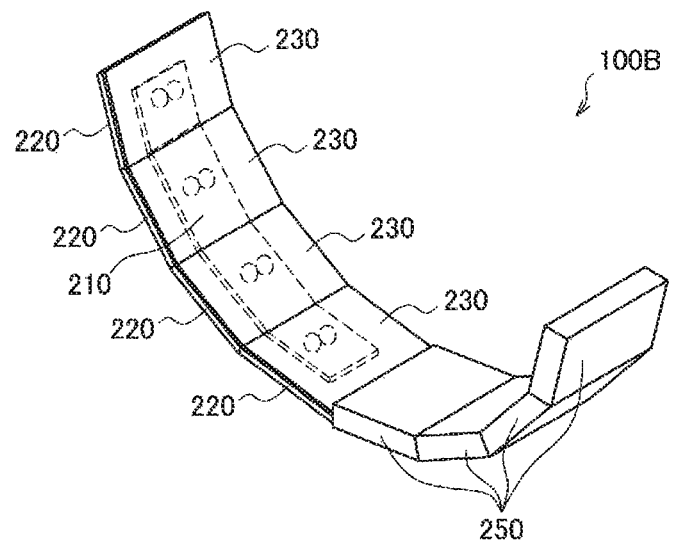
FIG. 22 is a perspective view illustrating a configuration example of a wearable device according to a second embodiment of the present disclosure.
Figure 23:
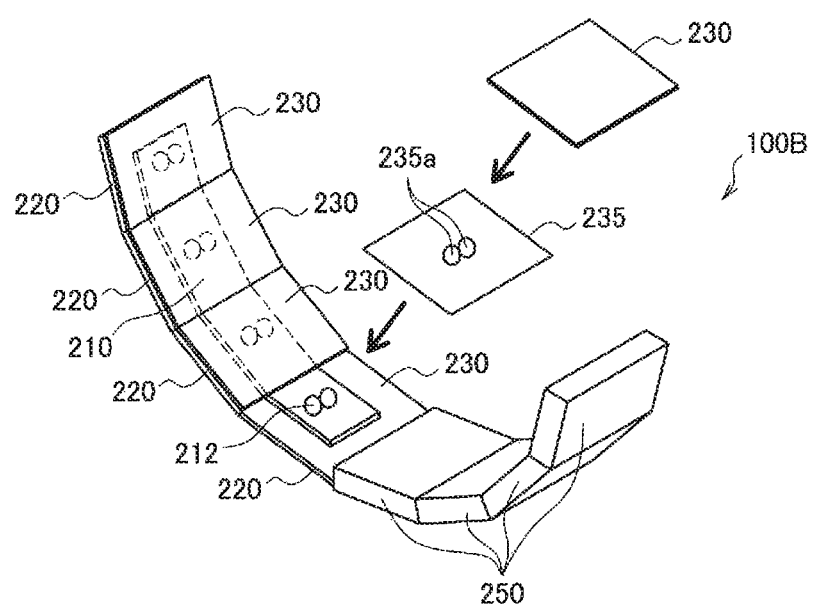
FIG. 23 is an assembly diagram of the wearable device according to the embodiment.

FIGS. 22 and 23 are explanatory diagrams illustrating a configuration example of the wearable device 100B according to the embodiment. FIG. 22 is a perspective view of the wearable device 100B, and FIG. 23 is an assembly diagram of the wearable device 100B. Although an example in which four unit blocks 23 are mounted on four holding members 220 is illustrated in FIGS. 22 and 23, the number of unit blocks 230 may be appropriate increased or decreased.

The wearable device 100B according to the embodiment includes a flexible circuit board 210, holding members 220, cover members 235, unit blocks 230, and length adjustment members 250. In the example illustrated in FIG. 22, the flexible circuit board 210 is disposed across the four holding members 220. The adjacent holding members 220 may be coupled to each other by a coupling mechanism, which is not illustrated in the drawing, or may be coupled by the flexible circuit board 210. Since the cover members 235 and the unit blocks 230 are installed on the holding members 220, the holding members 220 are thinner than the length adjustment members 250.

The flexible circuit board 210 is disposed across the four holding members 220, is pressed by the cover members 235 that are attached to the respective holding members 220, and is fixed. Pressing units for fixing the flexible circuit board 210, which is not illustrated in the drawing, may be provided at a part or the entirety of the holding members 220. Also, positioning units for positioning the flexible circuit board 210 may be provided at a part or the entirety of the holding members 220.

The flexible circuit board 210 includes electric connection units 212 at positions corresponding to the respective holding members 220. The cover members 235 include electrodes 235a on both surfaces at positions corresponding to the electric connection units 212 of the flexible circuit board 210, and the electrodes 235a on both surfaces are electrically connected to each other by through-holes. Furthermore, unit blocks 230 are installed on the cover members 235 set on the flexible circuit board 210. The unit blocks 230 are held by the holding members 220, and terminals, which are not illustrated in the drawing, of the unit blocks 230 and the electric connection units 212 of the flexible circuit board 210 are electrically connected to each other via the electrodes of the cover members 235. A method of fixing the cover members 235 and the unit blocks 230 on the holding members 220 is not particularly limited.

When the wearable device 100B illustrated in FIG. 22 is used as a belt of a wrist watch, an accessory, or the like, the unit blocks 230 are installed on the surfaces located inside (on the side of the body surface). Therefore, the wearable device 100B has an arrangement of the unit blocks 230 suitable for a case of using a thermoelectric conversion power generation device as a power generation device. If a solar power generation device is used as a power generation device, the unit blocks 230 may be installed on the surface located outside. In such a case, the flexible circuit board 210 may be disposed so as to be routed on both surfaces of the plurality of holding members 220. Alternatively, a configuration in which electrodes that are electrically connected by through-holes may be formed on both surfaces of the flexible circuit board 210 and the unit blocks 230 can be electrically connected to the flexible circuit board 110 from the outside of the holding members 220 may be employed.

4-2. Effects of Second Embodiment

As the wearable device 100B, it is possible to obtain a desired wearable device 100B with the power generation devices mounted thereon by arbitrarily selecting and connecting modularized unit blocks 230 of the device as described above. Since such a wearable device 100B includes the power generation devices, it is possible to eliminate effort or stress due to charging. Since such a wearable device 100B can be used as a belt part of a wrist watch, an accessory, or the like, it is possible to wear the wearable device 100B with no uncomfortable feeling and to eliminate stress during wearing. Furthermore, since the wearable device 100B has a belt-like appearance, it is possible to wear the wearable device 100B with no uncomfortable feeling due to the appearance thereof.

For the wearable device 100B according to the embodiment, it is possible to configure the wearable device 100B by freely selecting a type of a power generation device. Furthermore, it is possible to appropriately increase and decrease the number of unit blocks 130 of the devices to be mounted in the wearable device 100B and to enhance a degree of freedom when the wearable device 100B is configured. It is possible to obtain the wearable device 100B that can generate power in various environments of use by designing the wearable device 100B on which a plurality of types of power generation device can be mounted, for example.

In the wearable device 100B according to the embodiment, even a unit block 230 of a device, such as a solar power generation device or a thermoelectric conversion power generation device, that limits the arrangement position can be electrically connected by using both surfaces of the flexible circuit board 210. Therefore, it is possible to select an appropriate power generation device in accordance with a user purpose, an attachment position, an environment of use, or the like and to mount the power generation device on the wearable device 100B.

If the wearable device 100B is to be used for a relatively long period of time after an arbitrary power generation device is selected and the wearable device 100B is configured once, the terminal the unit block 230 and the electric connection unit 212 of the flexible circuit board 210 may be soldered. It is possible to enhance reliability of the electric connection for long-term use in this manner.

5. Third Embodiment

A wearable device 100C according to a third embodiment of the present disclosure is a device that can be used as a belt part of a wrist watch, an accessory, or the like in the same manner as the wearable device 100C according to the first embodiment. Hereinafter, differences between the wearable device 100C according to the embodiment and the wearable device 100A according to the first embodiment will be mainly described.

5-1. Configuration Example

Figure 24:
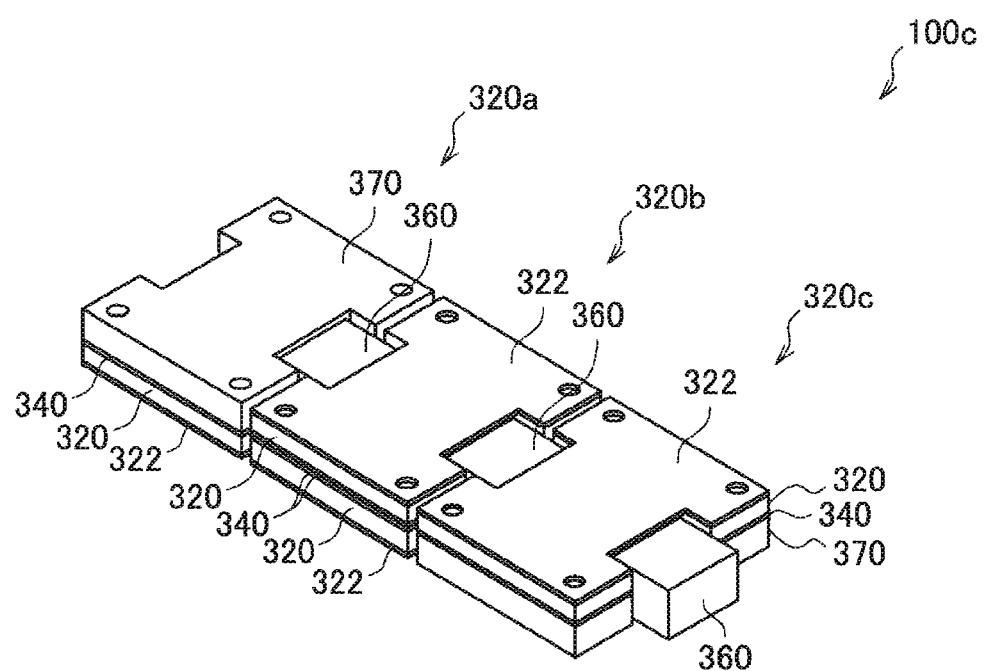
FIG. 24 is a perspective view illustrating a configuration example of a wearable device according to a third embodiment of the present disclosure.
Figure 25:
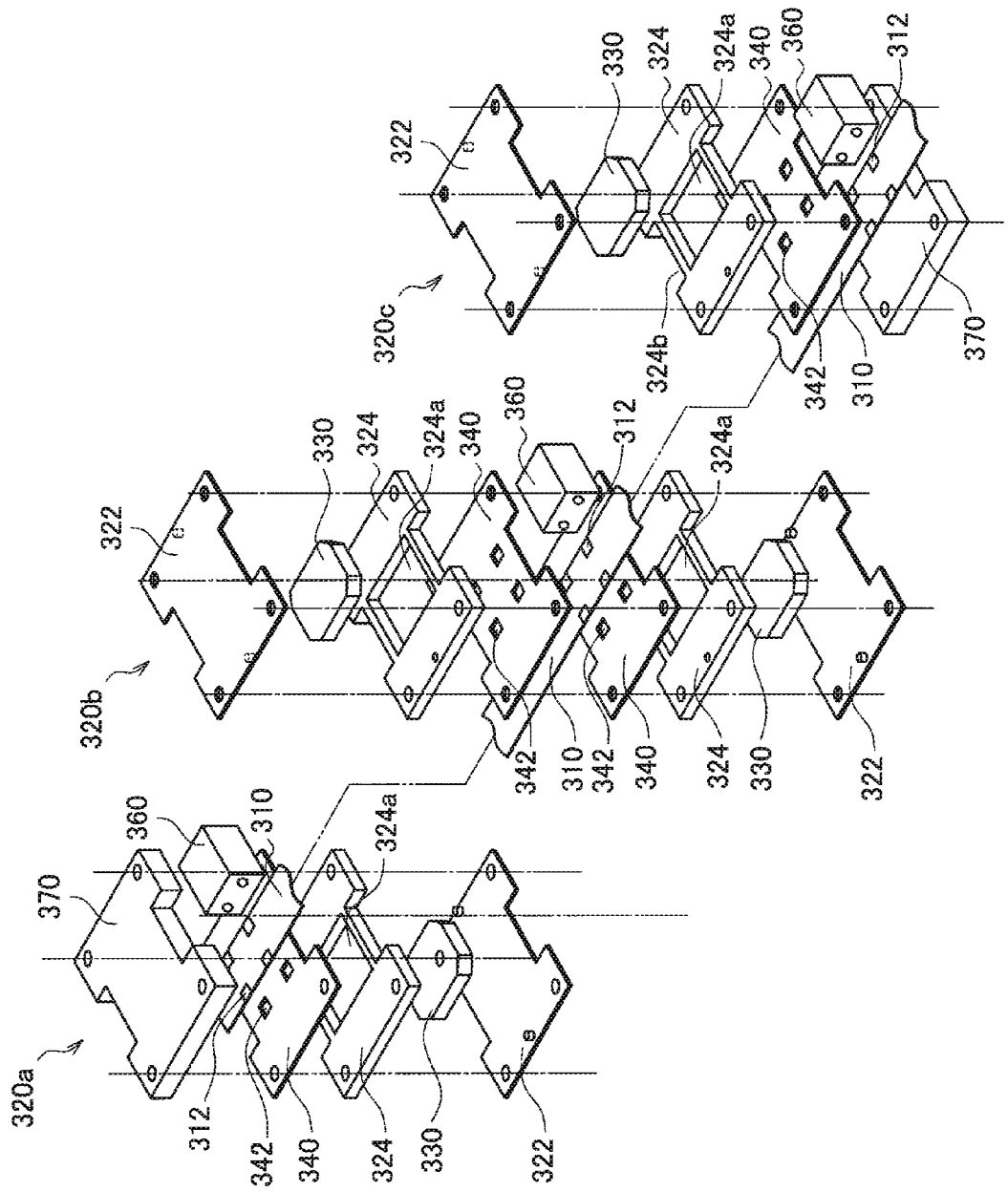
FIG. 25 is an exploded perspective view illustrating a configuration example of the wearable device according to the embodiment.

FIGS. 24 and 25 are explanatory diagrams illustrating a configuration example of the wearable device 100C according to the embodiment. FIG. 24 is a perspective view of the wearable device 100C, and FIG. 25 is an assembly diagram of the wearable device 100C. Although the wearable device 100C is configured of three pieces 320a, 320b, and 320c in FIGS. 24 and 25, the number of pieces may be appropriately increased or decreased.

One unit block 330 is mounted on each of the two pieces 320a and 320c at both ends, and two unit blocks 330 are mounted on the one piece 320b at the center. Although FIG. 25 illustrates the flexible circuit board 310 in such a manner that the respective pieces 320a, 320b, and 320c are cut, the flexible circuit board 310 is continuous in practice. Alternatively, the respective flexible circuit boards 310 may be electrically connected to each other.

In each of the two pieces 320a and 320c, the flexible circuit board 310, an electrode substrate 340, a holding member 324, and a cover 322 are mounted on a substrate 370 in this order and are fixed with a screw, a bolt, or the like which is not illustrated in the drawing. An accommodation unit 324a that is formed of a penetrating opening is formed at the center of the holding member 324, and the unit block 330 is accommodated in the accommodation unit 324a. The thickness of the unit block 330 coincides with or approximates to the thickness of the holding member 324.

The electrode substrate 340 includes electrodes 342 on both surfaces at positions corresponding to electric connection units 312 provided at the flexible circuit board 310. The electrodes 342 on both surfaces are electrically connected to each other via a through-hole. The terminal of the unit block 330 accommodated in the accommodation unit 324a of the holding member 324 can be arranged at such a position that the terminal can be brought into contact with the electrodes 342 of the electrode substrate 340. Then, the unit block 330 is pressed against the electrode substrate 340 by attaching the cover 322. The terminal of the unit block 330 and the electric connection unit 312 of the flexible circuit board 310 are electrically connected in this manner.

In the piece 320b at the center, the holding member 324, the electrode substrate 340, the flexible circuit board 310, the electrode substrate 340, and the holding member 324 are arranged and pinched in this order between two covers 322 and are fixed with a screw, a bolt, or the like which is not illustrated in the drawing. Accommodation units 324a that are formed of penetrating openings are formed at the centers of the two holding members 324, and the unit blocks 330 are accommodated in the respective accommodation units 324a. The thickness of the unit blocks 330 also coincides with or approximates to the thickness of the holding member 324.

The flexible circuit board 310 disposed at the piece 320b at the center includes electric connection units 312 on both surfaces. The two electrode substrates 340 include electrodes 342 on both surfaces at positions corresponding to the electric connection units 312 provided on both surfaces of the flexible circuit board 310. The respective electrodes 342 on both surfaces of the flexible circuit board 310 are electrically connected to each other via a through-hole. The terminals of the unit blocks 330 accommodated in the accommodation units 324a of the two holding members 324 are respectively arranged at such positions that the terminals can be brought into contact with the electrodes 342 of the electrode substrates 340. Then, the respective unit blocks 330 are pressed against the electrode substrates 340 by attaching the covers 322. The terminals of the unit blocks 330 and the electric connection units 312 of the flexible circuit board 310 are electrically connected in this manner.

In such a wearable device 100C, two unit blocks 330 are arranged on each of both front and rear sides. Therefore, it is possible to respectively arrange a solar power generation device that desirably faces the outside during the attachment and a thermoelectric conversion power generation device that desirably faces the inside (the side of the body surface) at appropriate positions, for example. Although not illustrated in the drawing, the cover 322 that covers the unit block 330 of the solar power generation device is provided with an opening that functions as a light transmitting unit that allows solar light to pass through to irradiate the unit block 330. At that time, a light-transmitting cover may be provided between the cover 322 and the unit block 330.

Although the coupling pins 128a and the pin receiving units 128b are provided at both ends of the case bodies (holding members) 124 to couple the pieces 120 to each other in the wearable device 100A according to the first embodiment, the three pieces 320a, 320b, and 320c are coupled by connection members 360 in the wearable device 100C according to the embodiment. Specifically, the respective pieces 320a, 320b, and 320c have a substantially H-shaped outline, and the connection members 360 are arranged at the recessed portions. For example, the respective pieces 320a, 320b, and 320c can be coupled to each other by forming protruding pins on both side surfaces of the connection members 360, forming pin receiving units on the surfaces, which face the protruding pins, of the holding members 324, and fitting the protruding pins into the pin receiving units. A coupling method using the connection members 36 is not limited to this example.

5-2. Effects of Third Embodiment

As the wearable device 100C according to the embodiment, it is possible to obtain a desired wearable device 100C with the power generation devices mounted thereon by arbitrarily selecting and connecting modularized unit blocks 330 of the device as described above. Since such a wearable device 100C includes the power generation devices, it is possible to eliminate effort or stress due to charging. Since such a wearable device 100C can be used as a belt part of a wrist watch, an accessory, or the like, it is possible to wear the wearable device 100C with no uncomfortable feeling and to eliminate stress during wearing. Furthermore, since the wearable device 100C has a belt-like appearance, it is possible to wear the wearable device 100C with no uncomfortable feeling due to the appearance thereof.

In the wearable device 100C according to the embodiment, even a unit block 330 of a device, such as a solar power generation device or a thermoelectric conversion power generation device, that limits the arrangement position can be electrically connected by using both surfaces of the flexible circuit board 310. Therefore, it is possible to select an appropriate power generation device in accordance with a user purpose, an attachment position, an environment of use, or the like and to mount the power generation device on the wearable device 100C. In the wearable device 100C according to the embodiment, it is possible to appropriately increase or decrease the number of unit blocks 330 of the devices to be mounted and to enhance a degree of freedom when the wearable device 100C is configured. For example, it is possible to obtain the wearable device 100C that can generate power in various environments of use by designing the wearable device 100C on which various types of power generation device can be mounted.

If the wearable device 100C is to be used for a relatively long period of time after an arbitrary power generation device is selected and the wearable device 100C is configured once, the terminal the unit block 330 and the electric connection unit 312 of the flexible circuit board 310 may be soldered. It is possible to enhance reliability of the electric connection for long-term use in this manner.

6. Fourth Embodiment (Example of Connection in Axial Direction)

A wearable device 100D according to a fourth embodiment of the present disclosure is a device in which the respective unit blocks are aligned in a predetermined direction, electrodes exposed from the respective unit blocks are electrically connected to each other, and circumferences thereof are covered with a covering member. The wearable device 100D according to the embodiment is a device that can be used by being wound around a wrist, a neck, a foot, or the like or can be used as a key holder or a strap. The wearable device 100D according to the embodiment can easily secure electric connection while a user arbitrarily selects the respective devices configured by modularized unit blocks.

6-1. Overall Configuration

Figure 26:
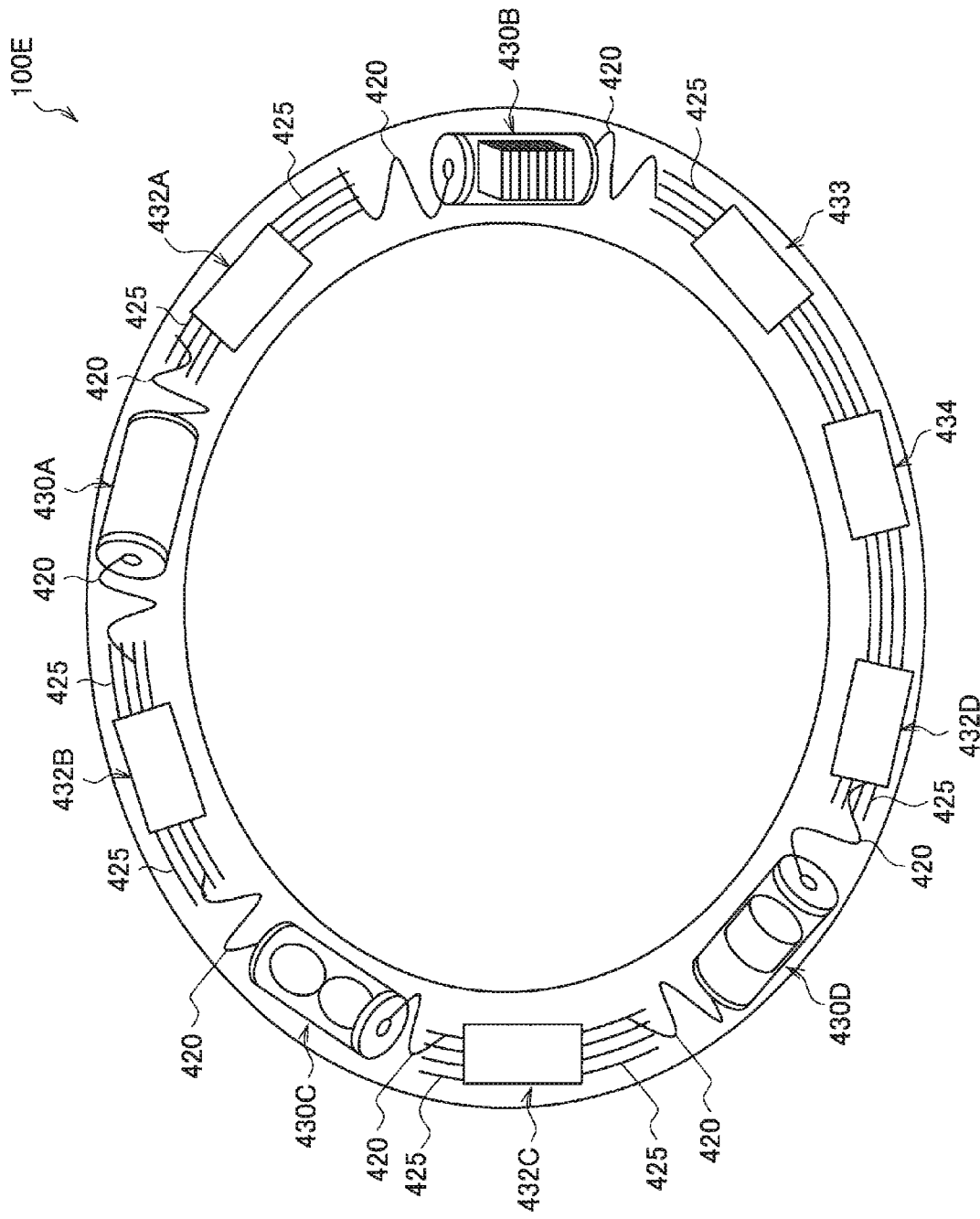
FIG. 26 is a perspective view illustrating an overall configuration of a wearable device according to a fourth embodiment of the present disclosure.
Figure 27:
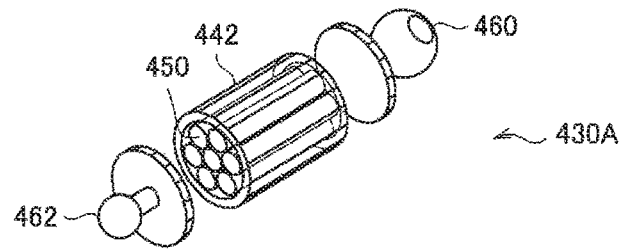
FIG. 27 is a diagram schematically illustrating an example of a unit block that uses an elastic electric connection unit.
Figure 28:
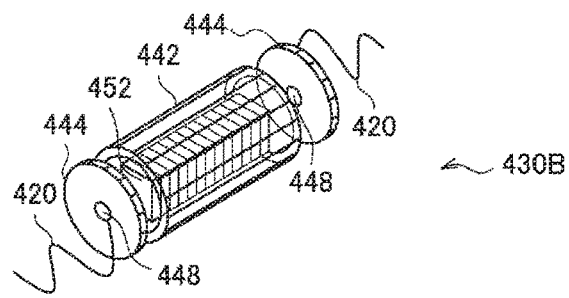
FIG. 28 is a diagram schematically illustrating an example of a unit block that uses an elastic electric connection unit.
Figure 29:
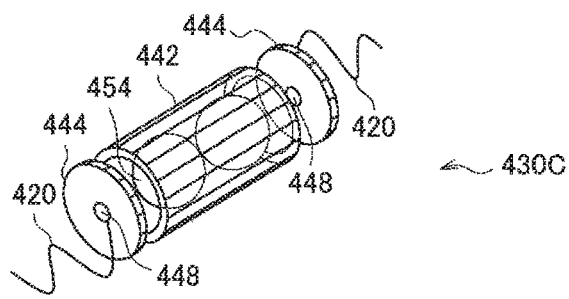
FIG. 29 is a diagram schematically illustrating an example of a unit block that uses an elastic electric connection unit.
Figure 30:
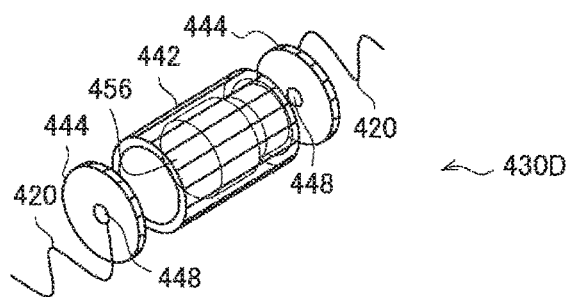
FIG. 30 is a diagram schematically illustrating an example of a unit block that uses an elastic electric connection unit.
Figure 31:
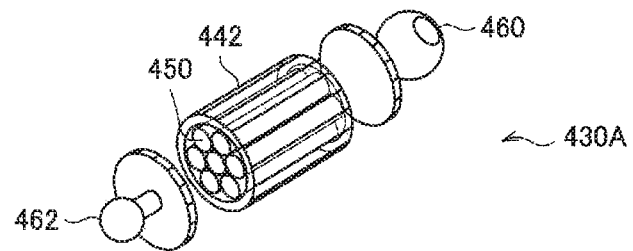
FIG. 31 is a diagram schematically illustrating an example of a unit block that uses a sliding electrode.
Figure 32:
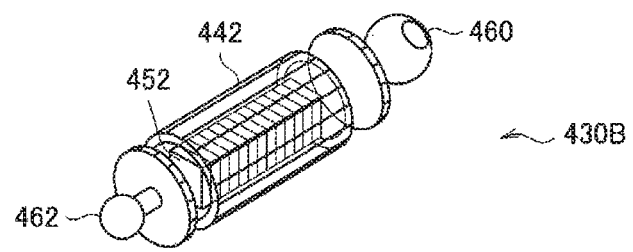
FIG. 32 is a diagram schematically illustrating an example of a unit block that uses a sliding electrode.
Figure 33:
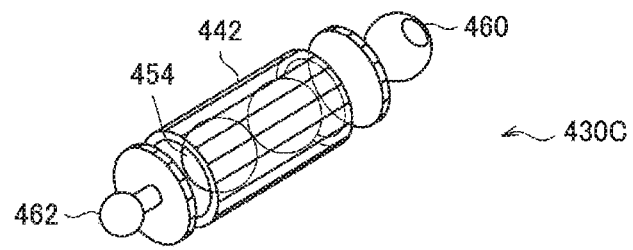
FIG. 33 is a diagram schematically illustrating an example of a unit block that uses a sliding electrode.
Figure 34:
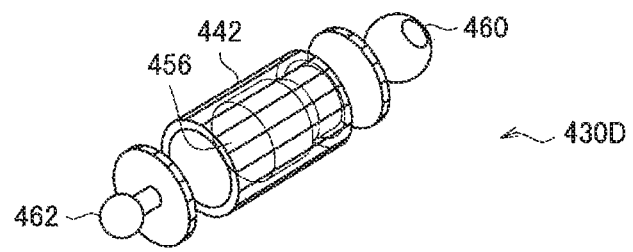
FIG. 34 is a diagram schematically illustrating an example of a unit block that uses a sliding electrode.

FIG. 26 is an explanatory diagram illustrating an overall configuration of the wearable device 100D according to the embodiment. FIG. 26 is a perspective view schematically illustrating a configuration example of the wearable device 100D. The wearable device 100D includes unit blocks 430A, 430B, 430B, and 430D that include power generation devices and electrical storage devices, unit blocks 432A, 432B, 432C, and 432D that include computation devices and storage devices, a unit block 433 that includes a shared computation device and a storage device, a unit block 434 of a communication device, and a covering member 410. In such a wearable device 100D, the respective unit blocks are aligned in a ring shape in a serial manner, the circumference thereof is covered with the covering member 410, and the entirety forms an annular shape.

The unit blocks 430A, 430B, 430C, and 430D include elastic electric connection units 420 that can stretch in an alignment direction at both ends in the alignment direction. Such elastic electric connection units 420 are formed by folding conductive fiber or flexible circuit boards with a predetermined length, for example. The unit blocks 432A, 432B, 432C, 432D, 433, and 434 include electric connection units 425 at both ends in the alignment direction. The electric connection units 425 are electrically connected to the elastic electric connection units 420 in a state of being covered with the covering member 410.

FIGS. 27 to 30 illustrates specific configuration examples of the unit blocks 430A, 430B, 430C, and 430D that include the power generation devices and the electrical storage devices. For the unit blocks 430A, 430B, 430C, and 430D, power generation devices that use a piezoelectric element 450, a thermoelectric element 452, a solar power generation element 454, or an electromagnetic induction power generation element 456 are respectively accommodated in substantially cylindrical holding members 422. Electrical storage devices or electric circuits in addition to the power generation devices may be accommodated in the holding members 442.

Covers 444, on front and rear surfaces of which electrodes electrically connected via through-holes 448 are formed, are attached at both ends of the holding members 442 in an axial direction. The elastic electric connection units 420 are connected to the electrodes on the outer surfaces of such covers 444. Such electric connection units 442 are formed by folding conductive fiber or flexible circuit boards on springs and can stretch in the axial direction. The power generation devices, the electrical storage devices, and the like that are accommodated in the holding members 442 are formed into coaxial shapes with the holding members 442 and are electrically connected to the electrodes of the covers 444 at the ends in the axial direction.

In addition to the unit blocks 430A, 430B, 430C, and 430D that include the power generation devices and the electrical storage devices, the unit blocks 432A, 432B, 432C, and 432D that include the computation devices and the storage devices, the unit block 433 that includes the shared computation device and the storage device, and the unit block 434 of the communication device may also be configured by using the aforementioned holding members 442, the electric connection units 420 or sliding electrodes 460 and 462. Also, the devices accommodated in the respective unit blocks are not limited to the above examples, and any one, two or more of the power generation device, the electrical storage device, the computation device, the storage device, and the communication device may be arbitrarily selected.

Returning to the description of FIG. 26, the covering member 410 may be a tube made of cloth or fiber, for example. Appropriate unit blocks are inserted into such a covering member 410 so as to be aligned in the order of electric connection. At this time, the elastic electric connection units 420 are pressed against the electric connection units 425 of adjacent unit blocks due to the elasticity thereof, and electric connection therebetween is secured. Therefore, it is possible to easily obtain the wearable device 100C by selecting unit blocks of the power generation devices and arbitrary devices and electrically connecting them. The electric connection units 425 connected to the elastic electric connection units 420 may or may not have elasticity.

If the covering member 410 is made of cloth or fiber and a solar power generation device is mounted, it is possible to allow the solar light to pass through gaps in the cloth or the fiber without especially providing openings and to compensate for efficiency in power generation by the solar power generation device. If a thermoelectric conversion power generation device that uses a body temperature is mounted, it is possible to install the thermoelectric conversion power generation device at a position near the body surface, to use vaporization heat by the covering member 410 absorbing moisture, and to enhance efficiency in power generation by the thermoelectric conversion power generation device.

According to the configurations of the unit blocks 430A, 430B, 430C, and 430D exemplified in FIGS. 27 to 30, it is possible to employ the axial direction for amplitude of vibration and thereby to compensate for efficiency in power generation when a vibration power generation device is mounted. Furthermore, the wearable device 100D according to the embodiment has a diameter that is equivalent to the size of a location where the wearable device 100D is attached, and if a power transmission device (rectenna) is mounted as a power generation device, the antenna size can be increased in accordance with the circumference of the wearable device 100D. Therefore, it becomes easy to collect radio waves, such as GSM (registered trademark: Global System for Mobile communication) and Wi-Fi, that are present as electric power.

The electric connection units 420 are not limited to the examples illustrated in FIGS. 27 to 30. FIGS. 31 to 34 illustrate other configuration examples of the unit blocks 430A, 430B, 430C, and 430D that includes power generation devices and electrical storage devices. For the unit blocks 430A, 430B, 430C, and 430D, power generation devices that use a piezoelectric element 450, a thermoelectric element 452, a solar power generation element 454, or an electromagnetic induction power generation element 456 are respectively accommodated in substantially cylindrical holding members 442. Electrical storage devices or electric circuits in addition to the power generation devices may be accommodated in the holding members 442.

In such an example, the unit blocks 430A, 430B, 430C, and 430D may include sliding electrodes 460 and 462 instead of the elastic electric connection units 420. The sliding electrodes 460 and 462 can establish electric connection with other electrodes while sliding.

6-2. Circuit Configuration

Figure 35:
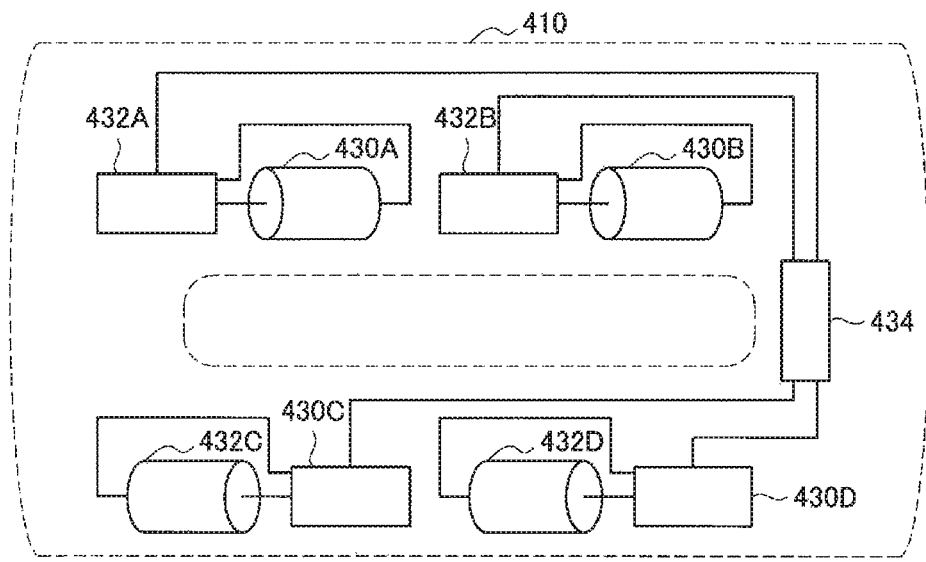
FIG. 35 is an explanatory diagram illustrating an example of a circuit configuration of the wearable device according to the embodiment.
Figure 36:
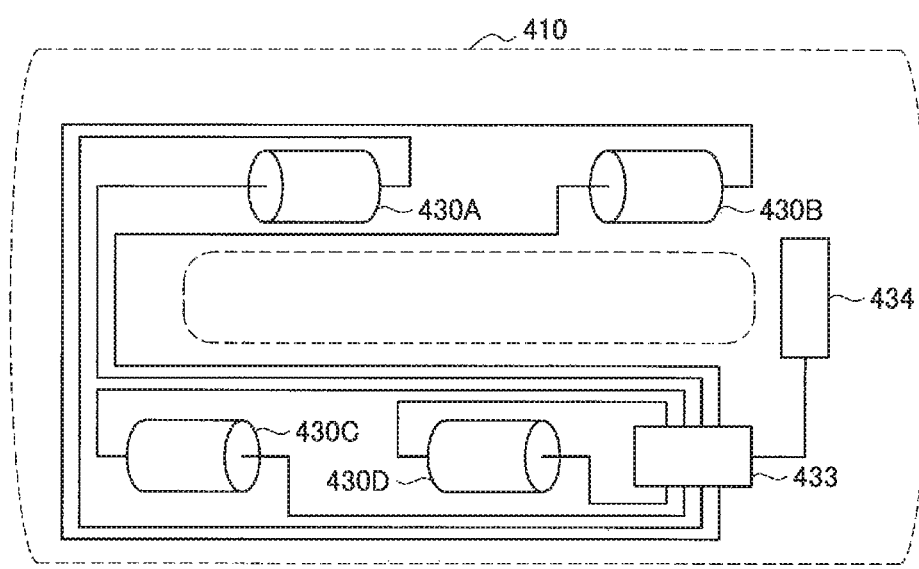
FIG. 36 is an explanatory diagram illustrating another example of the circuit configuration of the wearable device according to the embodiment.

FIGS. 35 and 36 are explanatory diagrams illustrating an example of a circuit configuration of the wearable device 100D. FIG. 35 illustrates an example in which the unit blocks 432A, 432B, 432C, and 432D that include individual computation devices and storage devices are provided for the respective unit blocks 430A, 430B, 430C, and 430D that include the power generation devices and the electrical storage devices. FIG. 36 illustrates an example in which the unit block 433 that includes the computation device and the storage device is provided so as to be shared by the unit blocks 430A, 430B, 430C, and 430D that include the power generation devices and the electrical storage devices.

If the unit blocks 432A, 432B, 432C, and 432D that include the individual computation devices and the storage devices are provided, the respective unit blocks 432A, 432B, 432C, and 432D may be electrically connected to the unit block 434 of the communication device. In contrast, if the unit block 433 that includes the shared computation device and the storage device is provided, the unit blocks 430A, 430B, 430C, and 430D that include the power generation devices and the electrical storage devices may be electrically connected to the unit block 433 that includes the shared computation device and the storage device, and the unit block 433 may be electrically connected to the unit block 434 of the communication device.

6-3. Effects of Fourth Embodiment

As the wearable device 100D according to the embodiment, it is possible to obtain a desired wearable device 100D with the power generation devices mounted thereon by arbitrarily selecting and connecting modularized unit blocks of the device as described above. Since such a wearable device 100D includes the power generation devices, it is possible to eliminate effort or stress due to charging. Since such a wearable device 100D can be used as a belt part of an accessory attached to a wrist, a neck, an ankle, or the like, a key holder, a strap, or the like, it is possible to wear the wearable device 100D with no uncomfortable feeling and to eliminate stress during wearing. Furthermore, since the wearable device 100D has a belt-like appearance, it is possible to wear the wearable device 100D with no uncomfortable feeling due to the appearance thereof.

The wearable device 100D according to the embodiment is covered with the covering member 410 made of cloth or fiber, and it is possible to compensate for efficiency in power generation even with a unit block 330 of a device, such as a solar power generation device or a thermoelectric conversion power generation device, that limits the arrangement position. In the wearable device 100D according to the embodiment, it is possible to appropriately increase or decrease the number of unit blocks 330 of the devices to be mounted and to enhance a degree of freedom when the wearable device 100D is configured. For example, it is possible to obtain the wearable device 100D that can generate power in various environments of use by designing the wearable device 100D on which various types of power generation device may be mounted.

Furthermore, it is possible to increase the length of the power generation device in the axial direction or the diameter thereof in the wearable device 100D according to the embodiment and to thereby compensate for efficiency in power generation even when a vibration power generation device or a power transmission device is mounted.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the above embodiments were described as the aspects in which the wearable device was able to be coupled to and used with a wrist watch, an accessory, or the like, for example, the present technology is not limited to such examples. For example, the wearable device may be attached to a foot, a neck, a body, or the like of an animal such as a farm animal.

Although the above embodiments were described as the aspects in which the unit blocks of the respective devices were connected to the flexible circuit board or were connected in the axial direction via the electrodes, the present technology is not limited to such examples. For example, a belt-shaped wearable device provided with unit blocks including power generation devices may be obtained by disposing electric wiring in advance on a belt attached to clothing and providing a predetermined installation position of the unit blocks with a predetermined shape.

Although the above embodiments were described as aspects in which the unit blocks of the respective devices mounted on the wearable device were electrically connected to each other, the present technology is not limited to such examples. For example, the respective unit blocks may be configured to include communication devices and transmit information to an external information processing apparatus configured separately from the wearable device.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A wearable device including:
at least one power generation device; or
a power generation device and at least one of an electrical storage device, a computation device, a storage device, and a communication device,
wherein any one of or a combination of those devices is configured of a unit block that is modularized.

(2)
The wearable device according to (1), further including:
a plurality of the power generation devices of different types.

(3)
The wearable device according to (1) or (2),
wherein a plurality of the unit blocks are electrically connected to each other.

(4)
The wearable device according to any one of (1) to (3),
wherein the unit block is connected to a flexible circuit board.

(5)
The wearable device according to (4),
wherein a plurality of the unit blocks are connected to front and rear sides of the flexible circuit board.

(6)
The wearable device according to (4) or (5), further including:
a holding member that holds the unit block,
wherein a terminal of the device abuts on and is electrically connected to an electric connection unit provided on the flexible circuit board by causing the holding member to hold the unit block.

(7)
The wearable device according to (6),
wherein the terminal of the device is pressed against the electric connection unit provided on the flexible circuit board by causing the holding member to hold the unit block and further covering the unit block.

(8)
The wearable device according to (7),
wherein in the case where the power generation device is a solar power generation device, the cover includes a light transmission unit.

(9)
The wearable device according to any one of (6) to (8),
wherein a plurality of the holding members are coupled to each other, and the flexible circuit board is disposed across the plurality of holding members.

(10)
The wearable device according to any one of (6) to (9), further including:
a length adjustment member that is coupled to the holding members and adjusts an entire length of the wearable device.

The wearable device according to any one of (1) to (3),
wherein a circumference of a plurality of the unit blocks is covered and held with a covering member in a state in which the plurality of unit blocks are aligned in a predetermined direction and electrically connected to each other.

(12)
The wearable device according to (11),
wherein the unit blocks include holding members that hold the device and an electric connection unit that is provided at an end of the holding members aligned in the predetermined direction.

(13)
The wearable device according to (12),
wherein the electric connection unit is an elastic electric connection unit that is able to stretch in the predetermined direction.

(14)
The wearable device according to (13),
wherein the elastic electric connection unit is a conductive fiber or a flexible circuit board.

(15)
The wearable device according to (12),
wherein the electric connection unit is a sliding electrode.

(16)
The wearable device according to any one of (1) to (15),
wherein the wearable device has a belt shape.

(17)
The wearable device according to any one of (1) to (16),
wherein the wearable device is able to be applied to a belt of a wrist watch or an accessory.

The invention claimed is:

1. A wearable device, comprising:
a plurality of power generation devices;
a plurality of modularized unit blocks, wherein each of the plurality of modularized unit blocks comprises a corresponding power generation device of the plurality of power generation devices;
a plurality of holding members, wherein each of the plurality of holding members is configured to accommodate a corresponding modularized unit block of the plurality of modularized unit blocks;
a flexible circuit board, wherein
each of the plurality of modularized unit blocks is connected to the flexible circuit board,
a first set of modularized unit blocks of the plurality of modularized unit blocks is connected to a first side of the flexible circuit board,
a second set of modularized unit blocks of the plurality of modularized unit blocks is connected to a second side of the flexible circuit board, and
the first side is opposite to the second side; and
a plurality of covers attached to the plurality of holding members, wherein
the flexible circuit board is between at least one cover of the plurality of covers and a corresponding holding member of the plurality of holding members,
the first side of the flexible circuit board is in contact with the at least one cover, and
the second side of the flexible circuit board is in contact with the corresponding holding member.

2. The wearable device according to claim 1, wherein a power generation device of the plurality of power generation devices is a solar power generation device.

3. The wearable device according to claim 1, wherein a first modularized unit block of the plurality of modularized unit blocks is electrically connected to a second modularized unit block of the plurality of modularized unit blocks.

4. The wearable device according to claim 1, further comprising a plurality of terminals, wherein
each of the plurality of modularized unit blocks has a corresponding terminal of the plurality of terminals, and
the corresponding terminal of a modularized unit block of the plurality of modularized unit blocks abuts on and is electrically connected to an electric connection unit on the flexible circuit board.

5. The wearable device according to claim 4, wherein the corresponding terminal of the modularized unit block is pressed against the electric connection unit on the flexible circuit board by the at least one cover.

6. The wearable device according to claim 5, wherein
a power generation device of the plurality of power generation devices is a solar power generation device, and
the at least one cover includes a light transmission unit.

7. The wearable device according to claim 4, wherein
a first holding member of the plurality of holding members is coupled to a second holding member of the plurality of holding members, and
the flexible circuit board is across the plurality of holding members.

8. The wearable device according to claim 4, further comprising a length adjustment member coupled to the plurality of holding members, wherein the length adjustment member is configured to adjust a length of the wearable device.

9. The wearable device according to claim 1, further comprising a covering member configured to cover circumferences of the plurality of modularized unit blocks, wherein the plurality of modularized unit blocks are aligned in a specific direction.

10. The wearable device according to claim 9, wherein an electric connection unit, that is at an end of the corresponding holding member of the plurality of holding members, is aligned in the specific direction.

11. The wearable device according to claim 10, wherein the electric connection unit is an elastic electric connection unit that is stretched in the specific direction.

12. The wearable device according to claim 11, wherein the elastic electric connection unit is one of a conductive fiber or the flexible circuit board.

13. The wearable device according to claim 10, wherein the electric connection unit is a sliding electrode.

14. The wearable device according to claim 1, wherein the wearable device has a belt shape.

15. The wearable device according to claim 1, wherein the wearable device is one of a wrist watch or an accessory.

\* \* \* \* \*